US008195667B2

(12) United States Patent
Shinjo et al.

(10) Patent No.: US 8,195,667 B2
(45) Date of Patent: Jun. 5, 2012

(54) BIT STRING SEARCH APPARATUS, SEARCH METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 0 days.

(21) Appl. No.: 12/805,183

(22) Filed: Jul. 16, 2010

(65) Prior Publication Data

US 2010/0287193 A1  Nov. 11, 2010

Related U.S. Application Data

(63) Continuation of application No. PCT/JP2008/003264, filed on Nov. 11, 2008.

(30) Foreign Application Priority Data

Jan. 17, 2008 (JP) .................................. 2008-007690

(51) Int. Cl.
G06F 7/00 (2006.01)
G06F 17/30 (2006.01)
(52) U.S. Cl. ....................................... 707/745; 707/758
(58) Field of Classification Search .................. 707/745, 707/758
See application file for complete search history.

(56) References Cited

U.S. PATENT DOCUMENTS 6,675,163 B1 * 1/2004 Bass et al. ............................ 1/1
2009/0210414 A1  8/2009 Shinjo

FOREIGN PATENT DOCUMENTS

| JP | 01-239632 | | 9/1989 |
|---|---|---|---|
| JP | 07-036755 | | 2/1995 |
| JP | 11-096058 | A | 4/1999 |
| JP | 05-265821 | A | 10/1999 |
| JP | 2001-357070 | A | 12/2001 |
| JP | 2006-187827 | A | 7/2006 |

(Continued)

OTHER PUBLICATIONS

Zin Li et al., "Stateful Inspection Firewall Session Table Processing", International Journal of Information Technology, China vol. 11 No. 2, pp. 21-30.

(Continued)

*Primary Examiner* — Robert Stevens
*Assistant Examiner* — Joshua Bullock
(74) *Attorney, Agent, or Firm* — Rader, Fishman & Grauer PLLC

(57) ABSTRACT

An index key is a key string formed of three or more keys whose tail-end key is unique, and a search key string for a bit string search has a unique key as its tail-end key. A branch node includes a search key sequence number expressing the position information of a key in the search key string to be used in the bit string comparison during the bit string search and the discrimination bit position for that key. Search for index keys is performed by extracting from the search key string the key with the search key sequence number in the branch node and repeatedly linking to one of the nodes of a node pair of the link target in response to the bit value at the discrimination bit position of that key until the leaf node corresponding to that index key is reached.

15 Claims, 16 Drawing Sheets

FOREIGN PATENT DOCUMENTS

| | | |
|---|---|---|
| JP | 2006-293619 A | 10/2006 |
| JP | 2007-114915 A | 5/2007 |
| JP | 2008-015872 A | 1/2008 |
| JP | 2008-112240 A | 5/2008 |
| JP | 2008-269503 A | 6/2008 |
| WO | WO-2008/004335 A1 | 1/2008 |

OTHER PUBLICATIONS

Supplemental European Search Report from European Patent Office for application No. 08871045.4 dated Aug. 16, 2011.

Ruiz-Sanchez et al., "Survey and Taxonomy of IP Address Lookup Algorithms", IEEE Network, IEEE Service Center, New York, NY, US, vol. 15, No. 2, Mar. 1, 2011, pp. 8-23.

Nilsson et al., "IP-Address Lookup Using LC-Tries", IEEE Journal on Selected Areas in Communications, IEEE Service Center, Piscataway US, vol. 17, No. 6, Jun. 1, 1999, pp. 1-12.

Sedgewick, "Algorithmen, 2.Auflage, Kapitel 17: Digitales Suchen", 2002, Addison-Wesley, Munchen, pp. 289-303.

Sklower, "A Tree-Based Packet Routing Table for Berkeley Unix", Proceedings of the Usenix CC +++, Berkeley, CA, US, Jan. 21, 1991, pp. 93-103.

Notice of Allowance from Japanese Patent Office for application No. 2008-007690.

Xin Li et al., "Stateful Inspection Firewall Session Table Processing", International Journal of Information Technology, China vol. 11 No. 2, pp. 21-30.

PCT/ISA/210, App. No. PCT/JP2008/003264, Feb. 10, 2009 (2 pages).

* cited by examiner

US 8,195,667 B2

BIT STRING SEARCH APPARATUS, SEARCH METHOD, AND PROGRAM

CROSS-REFERENCE TO RELATED APPLICATIONS

This application is a continuation of PCT/JP2008/003264 filed on Nov. 11, 2008, and is based and claims the benefit of priority of the prior Japanese Patent Application No. 2008-007690, filed on Jan. 17, 2008, the entire contents of which are incorporated herein by reference. The contents of PCT/JP2008/003264 are incorporated herein by reference in their entity.

BACKGROUND OF THE INVENTION

1. Field of the Invention

The present invention relates to a search apparatus, search method, and program that searches for a desired bit string from a set of bit strings, and more particularly to a field of art in which refinement is done to the data structure in which bit strings are stored to effect an improvement in search speed and the like.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 shows an example of a Patricia tree used for search processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011", and the test bit position 1730b is 1. The node 1750c is connected to the left link 1740b of the node 1750b, and the node 1750d is connected to the right link 1741b of the node 1750b. The index key held by the node 1750c is "000111", and the test bit position is 3. The index key held by the node 1750d is "011010", and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010", and the test bit position is 5. The left pointer 1740e of the node 1750e points to the node 1750b, and the right pointer 1741e of the node 1750e points to the node 1750e.

The index key held by the node 1750f is "101011", and the test bit position 1730f is 2. The node 1750g is connected to the left link 1740f of the node 1750f and the node 1750h is connected to the right link 1741f of the node 1750f.

The index key held by the node 1750g is "100011", and the test bit position 1730g is 5. The left pointer 1740g of the node 1750g points to the node 1750a, and the right pointer 1741g of the node 1750g points to the node 1750g.

The index key held by the node 1750h is "101100", and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases. When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links shown by the dotted lines in FIG. 16 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia shown in FIG. 17, the same amount of space must be allocated, etc., and there is not a very big space reduction effect. Also the problem of the delay in the search processing caused by a back links, and the difficulty of processing such as adding and deleting, etc., is not improved.

Also, if a record is to be searched for in a database, not only are searches performed with the values of items corresponding 1 to 1 with database records but are normally performed with the values of arbitrary items that compose a record as a search key. Because the values of those items, depending on the record, are not restricted to being unique, searches are performed with duplicate keys in a plurality of records. One example of handling such duplicate keys is cited in Patent Reference 2 below.

Patent document 1: Japanese Published Patent Application 2001-357070.

Patent document 2: Japanese Published Patent Application H11-96058.

SUMMARY OF THE INVENTION

The problem that the present invention attempts to solve is to provide a bit string search apparatus, and a search method, and a program having a data structure which requires only a small amount of storage capacity, performs searching at high speed, and features easy data maintenance while enabling a search with duplicate keys.

In order to resolve the problems in the above-noted conventional art, in the patent application 2006-187827 the applicant proposed a bit string search method using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc.

The bit string searches may also include various kinds of search requests, such as requests to find a minimum value or maximum value or searches for a value within a given range, etc. Regarding this point, this applicant proposed methods, etc., of obtaining maximum/minimum values of index keys included in any arbitrary subtree of a coupled node tree in Japanese patent application 2006-293619.

Also, this applicant proposed in Japanese patent application 2007-114915 the arrangement of the index keys in an area separate from a coupled node tree and the storage in the leaf nodes of the coupled node tree, instead the index keys, information showing the position in the storage area wherein those index keys are stored, and various search processing using such a coupled node tree.

However, because the configuration of the above noted coupled node tree is based on a difference bit position wherein the bit values of the index keys themselves will differ, that tree cannot handle duplicate keys as it is.

This invention has the purpose of enabling the handling of duplicate keys in a high-speed search method using this coupled node tree.

According to one illustrative embodiment of this invention, by combining a plurality of keys into a key string and ensuring that the tail-end key of the plurality of keys is unique and has no duplicates, an index key comprising a key string of a plurality of keys can be configured to be a unique key. Then a second position information showing the position in a storage area wherein those unique keys are stored in the leaf nodes of the above noted coupled node tree. The search key, combining a plurality of keys in a key string, is made to be a search key string wherein the tail-end key of the key string is unique. The branch node holds a search key sequence number, which expresses position information of a key within the search key string where the bit string comparison is to be performed in a bit string search, and a discrimination bit position, which shows the discrimination bit position for that key. The branch node also includes a first position information showing the position a primary node, which is one node of the node pair that is the link target.

Using a coupled node tree with the data configuration described above, a search is implemented by extracting from the search key string the key at the search key sequence number in a branch node and repeatedly linking to one of the nodes of a node pair of the link target in response to the bit value at the discrimination bit position of that extracted key until the leaf node is reached, and acquiring an index key stored in the storage area by the information stored in the leaf node that shows that position in the storage area.

In accordance with this invention, the handling of duplicate keys and an even higher speed search for bit string data is enabled. Furthermore, the addition and deletion of bit string data can easily be executed.

DESCRIPTION OF THE PREFERRED EMBODIMENT

Hereinafter an example of storing a coupled node tree in an array is described as a preferred embodiment for implementing this invention. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information for expressing the position of the primary node.

Figure 2A:
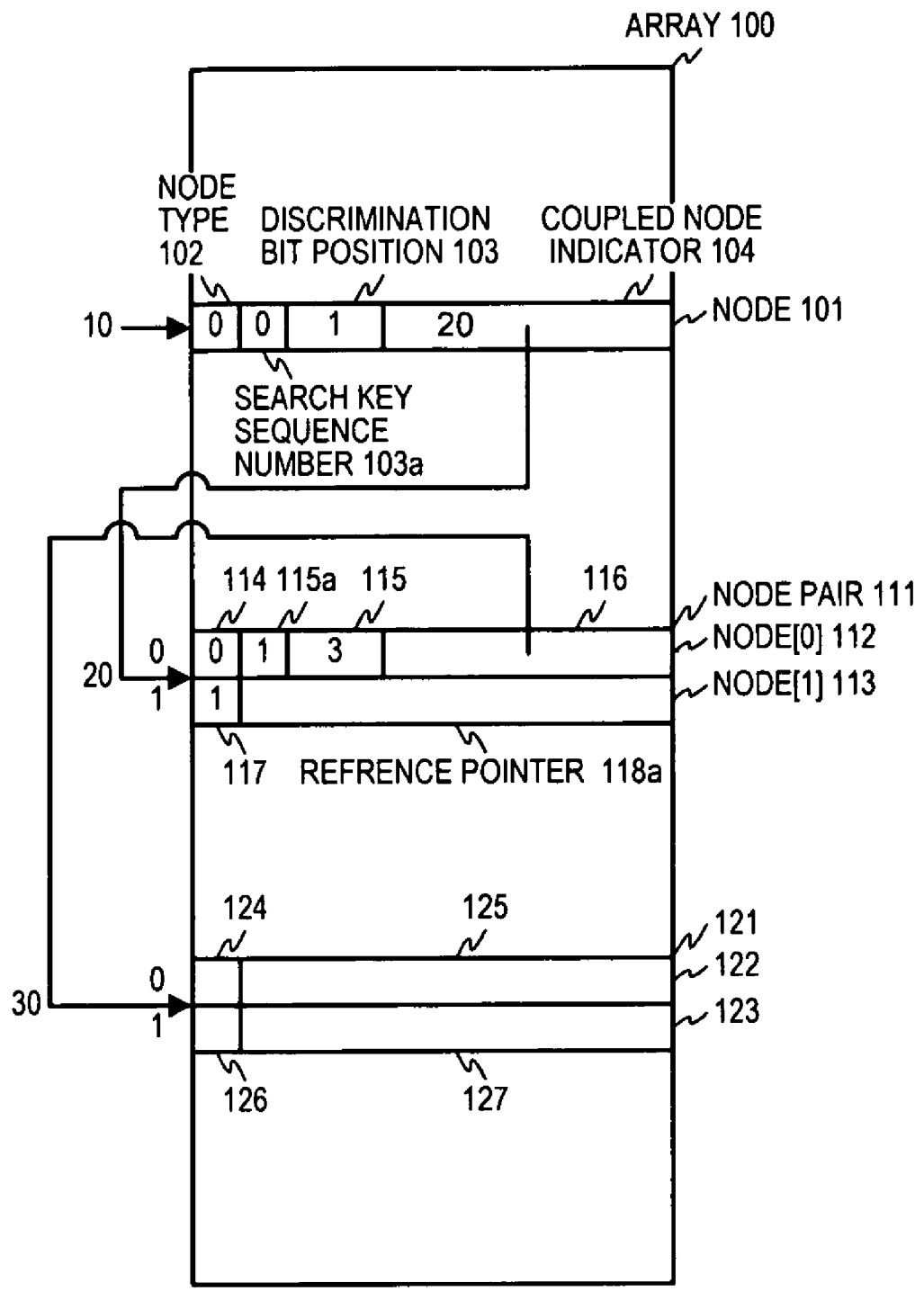
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, search key sequence number 103a, a discrimination bit position 103, and a coupled node indicator 104. The node type 102 is 0, which indicates that the node 101 is a branch node. The search key sequence number 103a is 0. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair. Furthermore, the values stored in the search key sequence number or the discrimination bit position are sometimes called the search key sequence number or the discrimination bit position.

The array element with the array element number 20 has stored therein a node [0] 112, which is the primary node of the node pair 111. The secondary node [1] 113 forming a pair with the primary node is stored into the next, adjacent, array element (array element number 20+1). Node [0] 112 is a branch node just like node 101. The value 0 is stored in the node type 114 of the node [0] 112, the value 1 is stored in the search key sequence number, the value 3 is stored in the discrimination bit position 115, and the value 30 is stored in the coupled node indicator 116. Also node [1] 113 is configured of the node type 117 and the reference pointer 118a. The value 1 is stored in the node type 117, thereby indicating that the node 1 [113] is a leaf node. A pointer referencing the storage area of the index key is stored in reference pointer 118a. The data stored in reference pointer 118a is a concrete example of the above noted second position information. In order to simplify the notation hereinafter, the data stored in the reference pointer is also called the reference pointer.

In the same manner as in a Patricia tree described above, in order to access the record corresponding to an index key, access target information is naturally necessary. The correspondence between the index key and the access target information can be enabled, for example, by storing the access target information corresponding to an index key in a storage area adjacent to the storage area holding the index key. Hereinafter, description of the access target information is omitted.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node. The contents of the node pair 121 formed by the node 122 and the node 123 that are stored in the array elements having array element numbers 30 and 31 are not shown.

The 0 or 1 that is appended to the node [0] 112, the node [1] 113, the node 122, and the node 123 indicates respectively to which node of the node pair linking is to be done when performing a search using a search key. Linking is done to the node of the array element number derived by adding to the coupled node indicator of the immediately previous branch node the 0 or 1, which is the bit value at the position pointed to by the discrimination bit position of the key (hereinafter called the search key) found at the search key sequence number in the search key string.

Therefore, by adding the bit value at the discrimination bit position of the search key found in the key string at the search key sequence number, to the coupled node indicator of the immediately previous branch node, it is possible to determine the array element number of an array element holding a node at the link target.

Although in the above-noted example the smaller of the array element numbers at which the node pair is located is used as the coupled node indicator, it will be understood that it is also possible to use the larger of the array element numbers in the same manner.

Figure 2B:
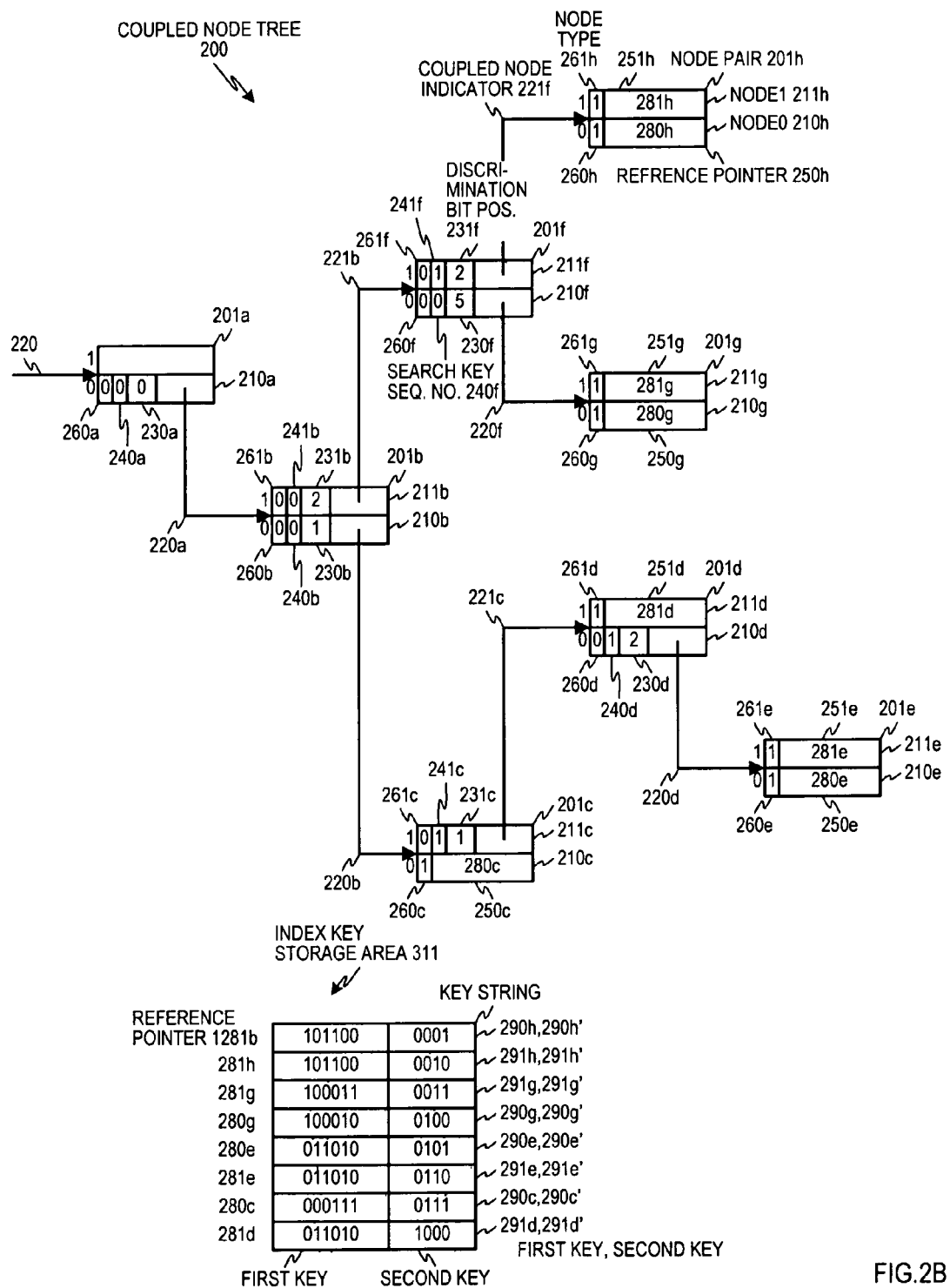
FIG. 2B is a drawing describing conceptually a tree structure of a coupled node tree.

FIG. 2B is a drawing that conceptually shows an embodiment of a tree structure of a coupled node tree and storage area for key strings (hereinafter these may be called index keys).

FIG. 2B exemplifies the tree structure of a coupled node tree 200. The reference numeral 210a indicates the root node. In the illustrated example, the root node 210a is the primary node of the node pair 201a located at array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

Figure 1:
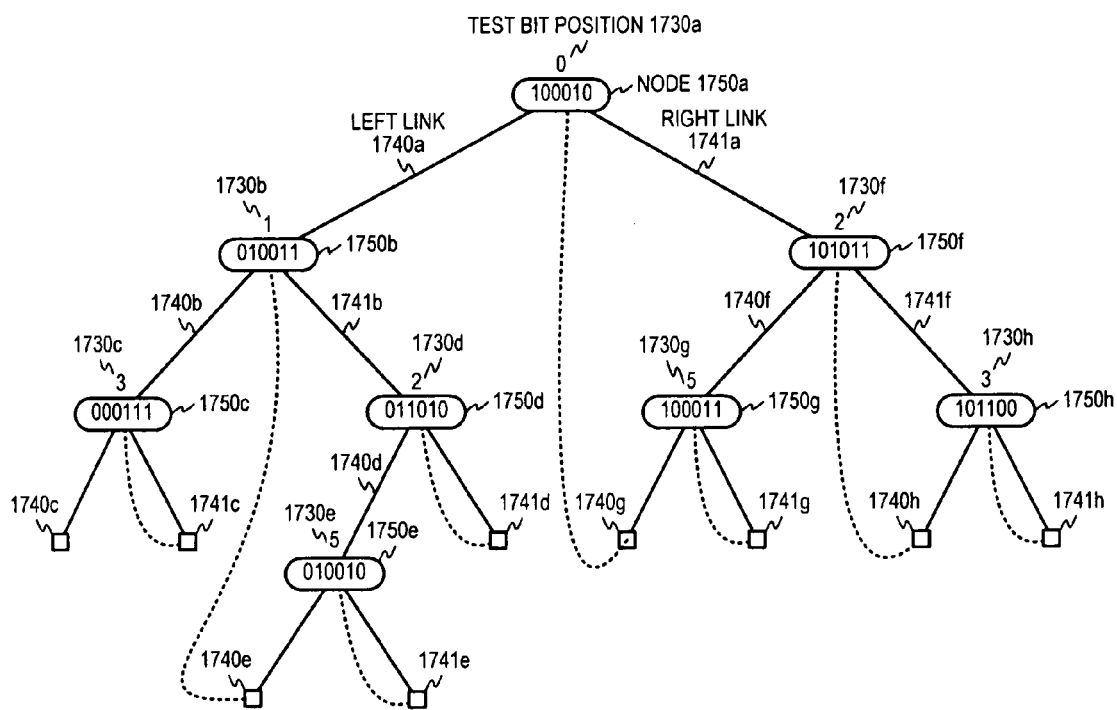
FIG. 1 is a drawing describing an example of a Patricia tree used in searching in the conventional art.

The 0 or 1 code that is appended before each node is the same as the codes that are appended before the array element numbers described in FIG. 1. The tree is traversed in accordance with the bit values at discrimination bit positions of the search key, so that the leaf node that corresponds to the index key that is the object of the search is found.

In the example shown, the node type 260a of the root node 210a is 0, thereby indicating that this is a branch node, the search key is 0, the search key sequence number 240a has a 0 and the discrimination bit position 230a has a 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The search key sequence number 240b of the node 210b has 0. The discrimination bit position 230b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes the reference pointer 250c. In the example shown, a pointer is stored in the reference pointer 250c that references a storage area holding an index key composed of a first key 290c and a second key 290c'. The data that is stored in reference pointer 250c is also called a reference pointer and is expressed by reference tag 280c. In the same way for other leaf nodes, the same word "reference pointer" is used both for the reference pointer storage area and for the data stored in the reference pointer storage area.

Although index key storage area 311 of FIG. 2B shows an example the storage area for a plurality of index keys laid out contiguously and this contiguous storage area altogether is expressed as the index key storage area 311, the index keys need not be stored in a contiguous area. Also the relation between the various leaf nodes in the tree structure and the disposition sequence of the index keys in the index key area 311 can be completely unrelated.

Returning to the node pair 201c, the node type 261c of the node 211c, which is the other node paired with the primary node 210c, is 0, the search key sequence number 241c is 1, the discrimination bit position 231c of the node 211c is 2, and in the coupled node indicator is stored the array element number 221c of an array element in which is stored the primary node 210d of the node pair 201d.

The node type 260d of the node 210d is 0, the search key sequence number 240d is 1, the discrimination bit position 230d is 2, and in the coupled node indicator is stored the array element number 220d of the array element in which is stored the primary node 210e of the node pair 201e. The node type 261d of the node 211d that is paired with the node 210d is 1, and the reference pointer 251d holds the reference pointer 281d that references the storage area holding the key string consisting of keys 291d "011010" and 291d' "1000".

The node types 260e and 261e of the nodes 210e and 211e of the node pair 201e are both 1, indicating that both are leaf nodes. In the reference pointers 250e and 251e are stored the reference pointers 280e and 281e respectively, which in turn reference the storage area holding the key string consisting of keys 290e "011010" and 290e' "0101", and the key string consisting of keys 291e "011010" and 291e' "0110" respectively.

The search key sequence number 241b of the node 211b, which is the other node of the node pair 201b, has a 0 and the discrimination bit position 231b has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the search key sequence numbers 240f, 241f are 0, 1 respectively; in discrimination bit positions 230f, 231f are 5 and 2, respectively. The array element number 220f of the array element in which is stored the primary node 210g of the node pair 201g is stored in the coupled node indicator of the node 210f, and the array element number 221f of an array element in which is stored the node [0] 210h, which is the primary node of the node pair 201h, is stored in the coupled node indicator of the node 211f.

The node types 260g and 261g of the nodes 210g and 211g of the node pair 201g are both 1, indicating that both are leaf nodes. In the reference pointers 250g and 251g of the nodes 210g and 211g are stored the reference pointers 280g and 281g respectively, which in turn reference the storage area holding the key string consisting of keys 290g "100010" and 290g' "0100", and the key string consisting of keys 291g "100011" and 291g' "0011" respectively.

In the same manner, the node types 260h and 261h of the node [0] 210h of the node pair 201h, and the node [1] 211h, which is paired therewith, are both 1, indicating that both are leaf nodes. In the reference pointers 250h and 251h of the nodes 210h and 211h are stored the reference pointers 280h and 281h respectively, which in turn reference the storage area holding the key string consisting of keys 290h "101100" and 290h' "0001", and the key string consisting of keys 291h "101100" and 291h' "0010" respectively.

The processing flow in searching for the index key "1011000010" from the above-noted tree is briefly described below. The above index key is a key string consisting of a first key "101100" and a second key "0010". The search key sequence numbers and the discrimination bit positions are numbered 0, 1, 2, . . . and so on from the left.

First, processing is started from the root node 210a using the bit string "1011000010" as the search key string. Because the search key sequence number 240a of the root node 210a is 0 and discrimination bit position 230a is 0, examining the bit value of the discrimination bit position 0 of the first key reveals 1. This being the case, 1 is added to the array element number 220a stored in the coupled node indicator and linking is done to the node 211b stored in the resulting array element number. Because 0 is stored in the search key sequence number of the node 211b and 2 is stored in the discrimination bit position 231b, examination of the bit value of the discrimination bit position 2 of the first key "101100" reveals 1, resulting in linking to the node 211f stored in the array element having the array element number 221b stored in the coupled node indicator.

Because 1 is stored in the search key sequence number of the node 211f and 2 is stored in the discrimination bit position 231f, examination of the bit value of the discrimination bit position 2 of the second key "0010" reveals 1, resulting in linking to the node 211h stored in the array element having the array element number 221f stored in the coupled node indicator.

Because the node type 261h of the node 211h is 1, indicating a leaf node, the storage area referenced by the reference pointer 281h is referenced and the key string consisting of keys 291h, 291h', which is the index key stored therein, is read out. Searching is performed in this manner using the coupled node tree. When the key string read out is compared with the search key string, it can be understood that they will coincide in the case illustrated above.

Also, although in the above description, the search key sequence number which distinguishes key positions in the search key string in a sequence of 0, 1, 2, . . . from the left is made a key position number based on the sequence lineup of the key, it is not restricted to this and, for example, it can be made an offset value from the first bit of the whole key or it could distinguish an alternation of key position by using alternately 0 and 1.

Next, the significance of the configuration of the coupled node tree will be described, with reference made to FIG. 2B.

The configuration of the coupled node tree is stipulated by a set of index keys. In the example of FIG. 2B, the search key sequence number of the root node 210a is 0 reflects the fact that some index keys differ in the first key, that is to say, not all keys are duplicates in their first keys. The discrimination bit position 230a of the root node 210a is 0 because there is an index key having a 0 at the 0th bit of its first key and an index key having a 1 at the 0th bit of its first key. The group of index keys having 0 at the 0th bit of its first key is classified under the node 210b, and the group of index keys having 1 at the 0th bit of its first key is classified under the node 211b.

That the discrimination bit position of the node 211b is 2 reflects a property of the index keys, this being that the 1st bits of all the nodes 211*h*, 210*h*, 211*g*, and 210*g* are the same value 0, a difference therebetween first occurring at the 2nd bit.

The fact that the search key sequence number in node 211*f* of the node pair 201*f* immediately below the node 211*b* is a 1 reflects the fact that the first keys 290*h* and 291*h* of the index keys corresponding to the leaf nodes 211*h* and 210*h* below node 211*f* are duplicates, and shows that their node position in the coupled node tree is determined by the second key bit strings 290*h*' and 291*h*'. And the fact that the discrimination bit position 231*f* in node 211*f* is a 2 is due to the fact that the value of second bit from the start of the second keys 290*h*' and 291*h*' differs first and, reflecting that value, the leaf nodes 211*h* and 210*h* are arranged in a position corresponding to their index keys.

Also, the discrimination bit position 230*f* of node 210*f* has a 5 because, in the index keys whose second bit of their first key is 0, both the third bit and the fourth bit coincide and the fifth bit differs. Due to the fact that there is only each of index keys with a 1 in the fifth bit and a 0 in the fifth bit, the nodes 210*g* and 211*g* that are the link targets of node 210*f* become leaf nodes, and in reference pointers 250*g* and 251*g* are stored the reference pointers 280*g* and 281*g*, which point to the storage areas wherein the key string consisting of keys 290*g* and 290*g*' and the key string consisting of keys 291*g* and 291*g*' are stored, respectively.

Even in the event that the index key set includes "1011010001" or "1011100001" in place of "1011000001", because there is equality with "1011000001" up until the 3rd bit of the first key and the second keys match, only the index key stored in the storage area expressed by reference pointer 280*h* for node 211*h* would change, there being no change in the structure of the tree itself. However, if "1011000000" is included in addition to "1011000001", the node 210*h* would become a branch node, the discrimination bit position thereof being 3.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "1011000010" for the node 211*h*, "1011000001" for the node 210*h*, . . . , and "0001110111" for the node 210*c*, these being sorted in descending order. That is, in a coupled node tree the index keys are disposed in the tree in a sorted sequence.

When searching using a search key string, the index key is followed over a path disposed on a coupled node tree, and in the case, for example of a search key string "1011000001" it is possible to reach the node 210*h*. As can be imagined from the above-noted description, even if the search key is made "1011000000", the node 210*h* will be reached, and the index key stored in the storage area expressed by the reference pointer 280*h* will be obtained as the search result key string.

Also, even in the case in which searching is done with "1001001001", in the link path of nodes 210*a*, 211*b*, and 210*f*, because the 3rd and 4th bits of the search key are not used and the 5th bit of the first key "100100" is 0, the node 210*g* will be reached, similar to the case searching with "1000100100". In this manner, the search key sequence number and the discrimination bit position are used in accordance with bit makeup of the index keys stored in the coupled node tree to perform branching.

Figure 3:
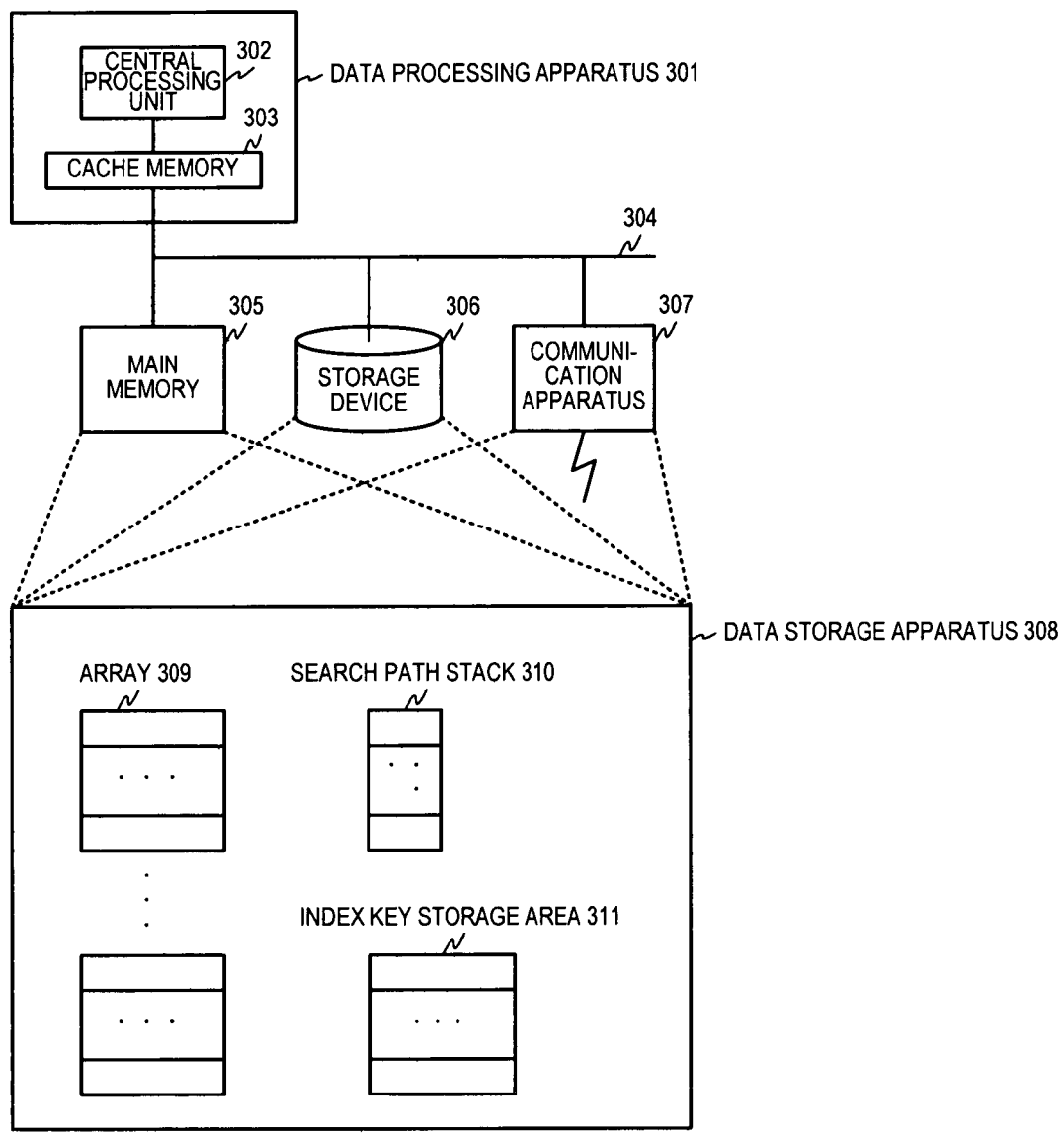
FIG. 3 is a drawing describing an exemplary hardware configuration for embodying the present invention.

FIG. 3 is a drawing describing an example of a hardware configuration for embodying the present invention.

Search processing and data maintenance are implemented with the search apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307. The array 100 in FIG. 2A is one embodiment of the array 309. Also, just as in FIG. 2B, the index key storage area 311 is shown as a contiguous area, but it is, of course, allowed to be a non-contiguous area. Furthermore, although the description makes the array element numbers of the array elements holding the nodes traversed during a search to be stored in search path stack 310 in order to describe the coupled node tree as being disposed in an array, normally, information showing the node position with an address, or the like, of the memory area holding the node is stored.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing. In the description below, just as for the search key sequence number noted earlier, the value set or stored in a temporary memory area may be called by the name of that temporary memory area.

As shown in FIG. 3, the array 309 consisting of the array elements holding the nodes of the coupled node tree and the index key storage area 311 are separate areas. Thus compared to the case wherein the index keys are included in the array elements holding leaf nodes, the amount of storage needed for each array element in the configuration of FIG. 3 typically is smaller. In other words, by separating the index key storage area 311 from the array 309 holding the coupled node tree, more nodes can be contained in each cache block when the coupled node tree is read into the cache memory 303. As a result, in the search processing and so forth described later the frequency of cache misses is reduced and faster processing is enabled.

Next, details of the basic operations using the coupled node tree related to a preferred embodiment of this invention, the operations of searching, inserting, and deleting, are described successively.

Figure 4:
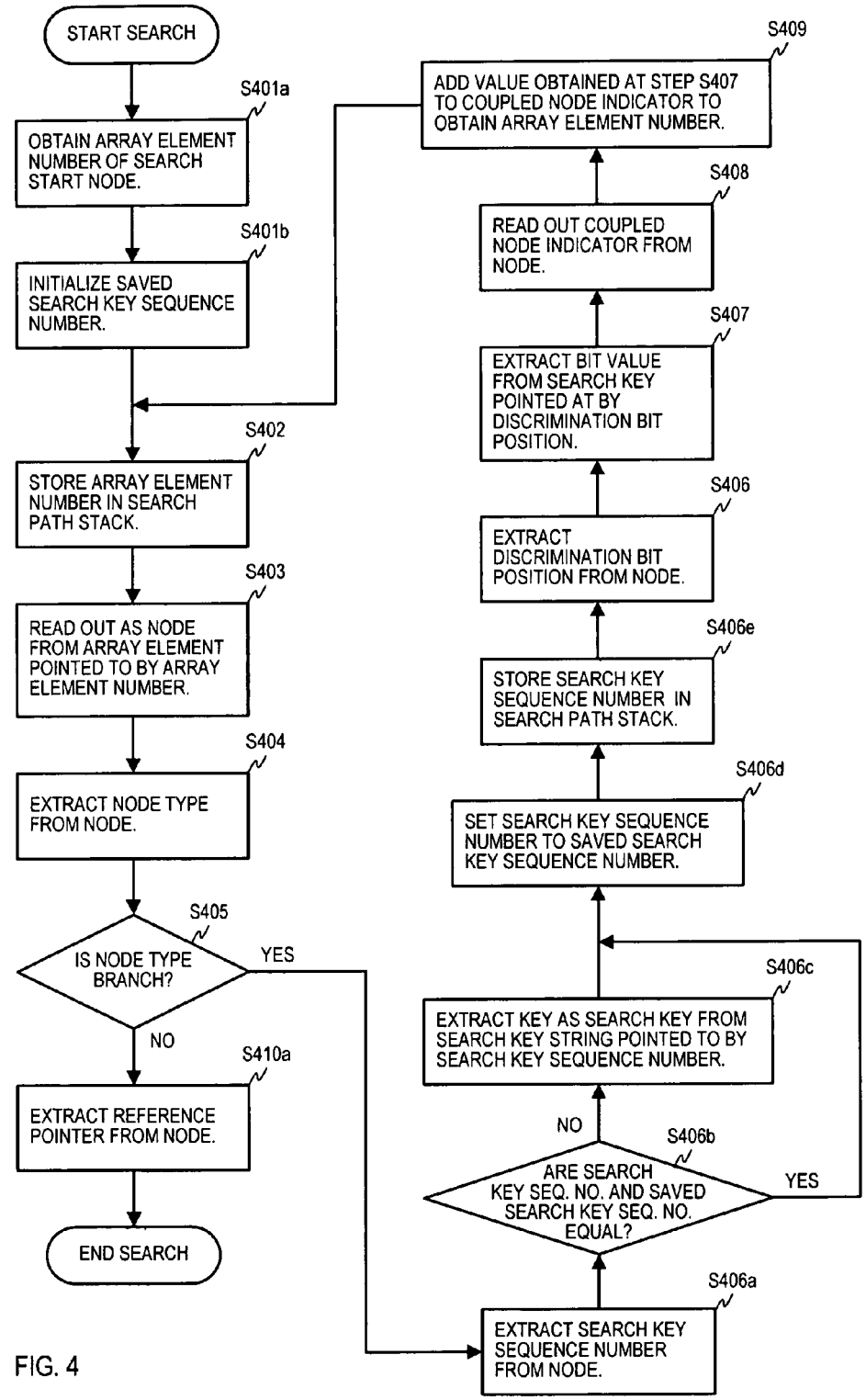
FIG. 4 is a flowchart showing search processing in an embodiment of the present invention.

FIG. 4 is a flowchart showing bit string search processing in an embodiment of the present invention.

First, at step S401*a*, the array element number of the search start node is obtained. The search start node can be any node configuring the coupled node tree and it is stored in the array element that corresponds to the acquired array element number. How the search start node is specified will be described later in the descriptions of the various search applications.

The array element number of the obtained search start node is set in an unshown search start node setting area. This search start node setting area is one of the "temporary memory areas used to enable various values obtained during processing to be used in subsequent processing". Instead of an expression like "set in an unshown search start node setting area", the description may say "obtain the array element number of the search start node" or "set as the search start node" or simply as "set the search start node".

Next, at step S401b, a search key sequence number save area which is a temporary memory area for saving the value of the search key sequence number is initialized. Since 0 is set as the search key sequence number of the first key string of the index keys, a minus value (any value less than 0) is set as the initial value.

Next, at step S402, the array element number obtained is stored on the search path stack. Proceeding to step S403, the array element corresponding to that array element number is read out as the node to be referenced. Then, at step S404, the node type is extracted from the read-out node, and at step S405, a judgment is made as to whether the node type indicates a branch node.

If the judgment made at step S405 is that the node type indicates a branch node, processing proceeds to step S406a. At step S406a, the search key sequence number is extracted from the node. Next, at step S406b, a determination is made whether the extracted search key sequence number coincides with the saved search key sequence number.

If the extracted search key sequence number coincides with the saved search key sequence number, processing moves to step S406, and they do not coincide, processing proceeds to step S406c, wherein the key pointed to by the search key sequence number extracted in step S406a is extracted from the search key string and is set in the search key.

Next at step S406d, the search key sequence number extracted in step S406a is set in the search key sequence number save area and processing proceeds to step S406.

At step S406, the discrimination bit position is extracted from the node read out in step S403, and in addition at step S407 the bit value corresponding to the discrimination bit position extracted at step S406 is extracted from the search key. Then, at step S408, a coupled node indicator of the node read out in step S403, and, at step S409, the bit value extracted from the search key is added to the coupled node indicator, thereby obtaining a new array element number, and return is made to step S402.

Thereafter the above-described loop processing from step S402 to step S409 is repeated until the judgment at step S405 is leaf node and processing proceeds to step S410a. At step S410a, the reference pointer is extracted from the leaf node and the search terminates.

Figure 5:
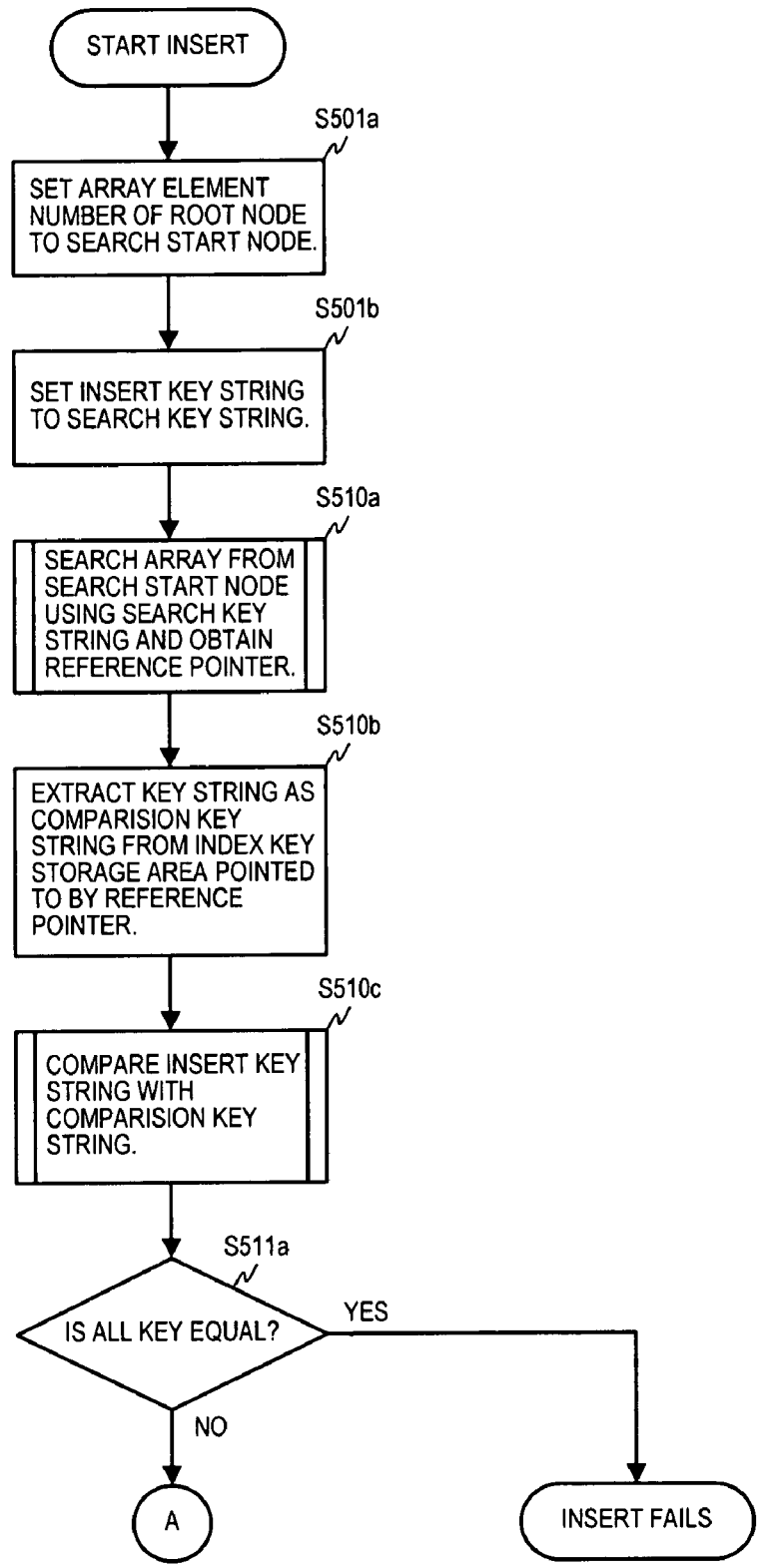
FIG. 5 is a drawing showing the flow of search processing, which is the first part of the insert processing in an embodiment of the present invention.
Figure 6:
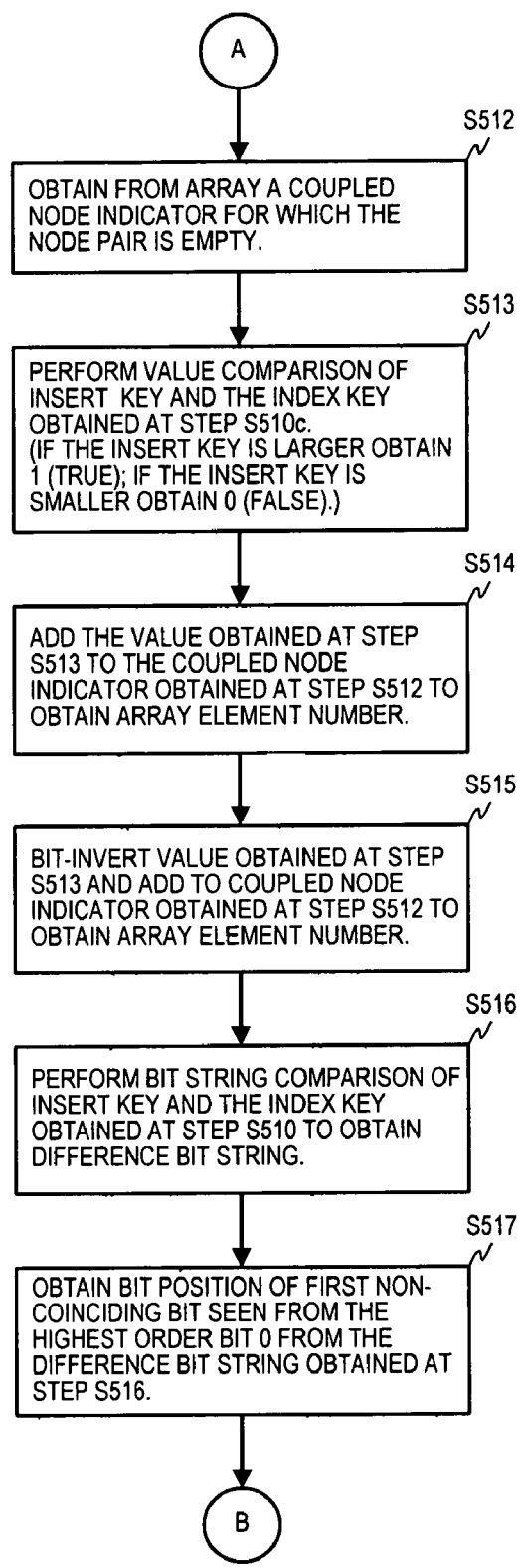
FIG. 6 is a drawing describing the processing flow for preparing array elements for a node pair to be inserted in insert processing in an embodiment of the present invention.
Figure 7:
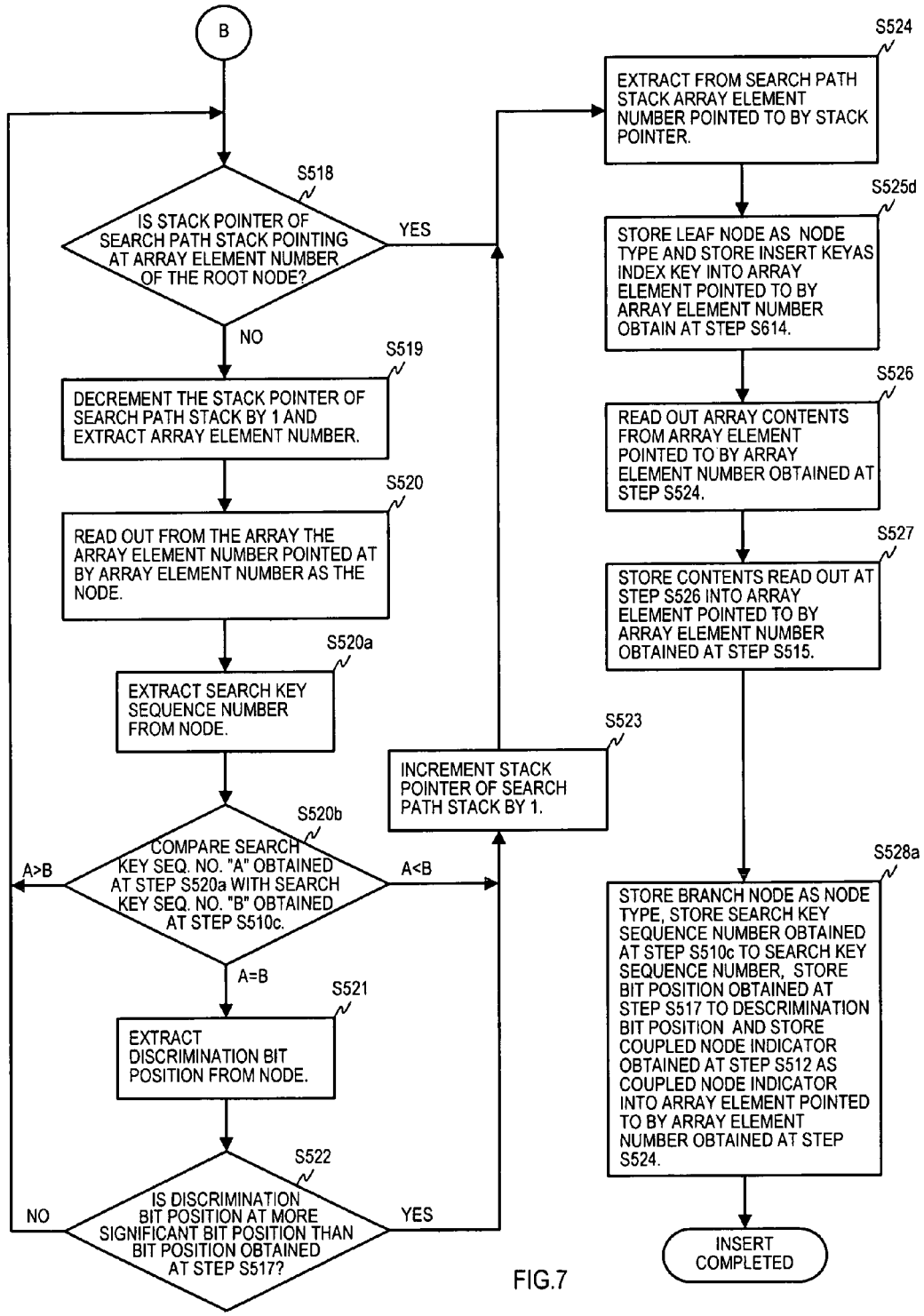
FIG. 7 is a drawing showing the processing flow for determining the position at which a node pair is to be inserted, and the storing of the content of each node of the node pair to complete the insert processing.

Next, FIG. 5 to FIG. 8A will be used to described node insert processing in a coupled node tree. FIG. 5 to FIG. 7 describe the usual insert processing, and FIG. 8A describes the processing for insert of a root node. By root node insert processing and usual insert processing, because a coupled node tree is generated, the description of the node insert processing is also a description of the processing to generate a coupled node tree.

FIG. 5 is a drawing showing the processing flow for search processing, which is the first stage of insert processing, this corresponding to the using of an insert key string as a search key string in the search processing shown in FIG. 4.

First, at step S501a, the array element number of the root node is set in the search start node, and at step S501b, the insert key string is set in the search key string. As for the insert key string, a pointer to a storage area of an index key is acquired beforehand and the insert key string is taken to be stored there in that storage area as a prerequisite of the insert processing. The tail-end key of the insert key string is taken to be a unique value among all the index keys.

Next, in step S510a, the search processing shown in FIG. 4 is performed with the search key string from the search start node, and a reference pointer is acquired, and, in step S510b, the key string pointed to by the reference pointer is extracted and set in the comparison key string.

Next, in step S510c, the key of insert key string and the key of the comparison key string are successively compared. Information as to whether the comparison key string completely coincides with the insert key string is output as the result of the comparison. If they do not completely coincide, the position of the key with first non-coincidence is set in the search key sequence number, the key in the insert key string at the search key sequence number is set in the insert key, and the key in comparison key string at the search key sequence number is set in the comparison key. Details about step S510c are described later referencing FIG. 8B.

At step S511a, a judgment whether each of all the keys in the insert key string and in the comparison key string is equal is done based on the comparison result which is performed at step S510c and, because if there is equality the insert key string already exists in the coupled node tree, the insert fails, and processing ends. If, however, there is no equality, processing proceeds to step S512 and thereafter in FIG. 6.

FIG. 6 is a processing flowchart describing the processing to prepare an array element for a node pair to be inserted.

In step S512, an empty node pair is obtained from the array, and the array element number of the array element to be made the primary node of the node pair is acquired.

Proceeding to step S513, a magnitude comparison is performed between the insert key and the comparison key which are obtained in step S510c and, in the case in which the insert key is larger, the Boolean value 1 is obtained, but if the insert key is smaller, the Boolean value 0 is obtained.

Proceeding to step S514, the Boolean value obtained at step S513 is added to the array element number of the primary node obtained at step S512 to obtain an array element number.

Proceeding to step S515, the logical negation value of the Boolean value obtained at step S513 is added to the array element number of the primary node obtained at step S512 to obtain an array element number.

The array element number obtained at step S514 is the array element number of the array element wherein is stored a leaf node having a reference pointer to a storage area holding the insert key string as an index key, and the array element number obtained at step S515 is the array element number into which a node that forms a pair with that leaf node is stored.

That is, by means of the magnitude relationship between the index key that corresponds to the leaf node obtained by the first stage of search processing and the insert key string, a determination is made of into what node of the node pair to be inserted the node holding the reference pointer to insert key string is to be stored.

For example, in the case in which the insert key string "0110111001" is to be inserted into the coupled node tree of FIG. 2B, the index key resulting from the search is the key string "0110101000" corresponding to node 211d. When keys of the insert key string and the search result key string are successively compared, the two key strings are non-coincident at their first key, and a Boolean value is obtained by performing a magnitude comparison between the first keys.

In this example, because the first key of the insert key string is larger, the Boolean value 1 is obtained, so that the leaf node that holds the reference pointer to the insert key string is stored in an array element having an array element number obtained by adding 1 to the array element number of the primary node of the node pair to be inserted. The reference pointer 281d to the index key "0110101000" is stored in an array element having an array element number obtained by adding the logical negation value of the Boolean value obtained by the magnitude comparison to the array element number of the primary node.

When this is done, because the first key 291d "011010" of the index key and the first key "011011" of the insert key differ at the 5th bit, the node 211d is a branch node, with a discrimination bit position of 5, whose coupled node indicator is the array element number of the primary node of the node pair to be inserted.

In the case also in which "0110011010" is to be inserted into the coupled node tree of FIG. 2B, the index key resulting from the search is "0110101000" that is stored in node 211d. In this case, too, because first keys of the insert key string and the search result key string do not coincide and in this case the first key of the insert key string is smaller, the Boolean value 0 is obtained, so that the leaf node that holds the reference pointer to the insert key string is stored in an array element having an array element number obtained by adding 0 to the array element number of the primary node of the node pair to be inserted. Then, because first key 291d "011010" of the index key and the first key of the insert key string "011001" differ at the 4th bit, the node 211d is a branch node, with a discrimination bit position of 4, whose coupled node indicator is the array element number of the primary node of the node pair to be inserted.

At step S516, a bit string comparison, for example, an exclusive-OR, is performed between the insert key and the comparison key which are obtained at step S510c so as to obtain a difference bit string.

Proceeding to step S517, from the difference bit string obtained at step S516, starting from the most-significant 0th bit, the first bit position at which there is a non-coincidence (hereinafter called the difference bit position) is obtained. This processing can be performed by, for example, a CPU having a priority encoder, the difference bit string being input thereto and the difference bit position being obtained. It is alternatively possible to perform the equivalent processing using software, to obtain the first bit position at which there is non-coincidence.

Continuing to step S517, the processing of step S518 and below shown in FIG. 7 is performed.

FIG. 7 is a drawing showing the processing flow for storing a node in the array element prepared in FIG. 6, obtaining its insert position and changing the contents of an existing node, thereby completing the insert processing.

The processing from step S518 to S523 is the processing to obtain the position in the coupled node tree for inserting a node pair, and the process from step S524 and below is the processing to set data in each node and thereby complete the insert processing.

In step S518, a determination is made as to whether the stack pointer of the search path stack is pointing at the array element number of the root node. If it is, processing proceeds to step S524, but if it is not processing proceeds to step S519.

At step S519, the stack pointer of the search path stack is decremented by 1, and the array element number stacked at that point is extracted.

Proceeding to step S520, the array element with the array element number obtained in step S519 is read out from the array as a node.

Proceeding to step S520a, the search key sequence number is extracted from the node read out in step S520, and in step S520b, a magnitude comparison is made between the search key sequence number "A" obtained at step S520a and the search key sequence number "B" obtained at step S510c.

If A>B, return is made to step S518, and if A=B, processing proceeds to step S521, and if A<B, processing proceeds to step S523.

At step S521, the discrimination bit position is extracted from the node read out in step S520, and processing proceeds to step S522, wherein a judgment is made as to whether the discrimination bit position read out at step S521 is of higher order than the difference bit position obtained at step S517. In this case, the term higher order means more to the left in the bit string, that is, having a lower bit position value.

If the result of the judgment at step S522 is negative, return is made to step S518, and repetition is done until either the judgment at step S518 is affirmative or the judgment at step S522 is affirmative. When an affirmative judgment results at step S522, processing proceeds to step S523.

At step S523, the stack pointer of the search path stack is incremented by 1, and processing proceeds to the processing of step S524 and thereafter.

In the above-described processing at step S518 to step S523, in order to determine the position of insert of a node pair, a check is made of the relative positional relationship between the search key sequence number (A) of the branch node whose array element number is stored in the search path stack and the search string sequence number (B) acquired in step S510c, and if A<B, the link target of the branch node is taken as the insert position of the node pair, and if A=B, a check is made of the relative positional relationships between the difference bit position, whose value became different in a bit string comparison of the index key (insert key) to be inserted and the index key (comparison key) acquired by the search, and the discrimination bit positions of the branch nodes whose array element numbers are stored in the stack. And the link target of the branch node following the branch node whose discrimination bit position becomes higher order than the difference bit position is made the insert position for the node pair to be inserted.

Also in the case wherein the search path stack is back-traced until the root node, the link target of the root node becomes the insert position.

For example, when "1110000000" is inserted in the coupled node tree of FIG. 2B, the search result index key becomes "1011000001" corresponding to node 210h. In the case of this example, because the search key sequence number (A) is 1 (search key sequence number 241f) and the search key sequence number (B) is 0, the result is A>B and because when the link path returns to node 211b the search key sequence number 241b is 0, the result is A=B. In the case of this example, the difference bit position between the insert key "111000" and the comparison key "101100" is 1 and because the discrimination bit position 231b is 2, back-tracking is further done up to the root node 210a.

Because the discrimination bit position 230a of the root node 210a is 0 and has a higher order than the difference bit position 1, the stack pointer points to 220a+1. Thus the insert position is the link target of node 211b. The discrimination bit position of branch node 211b becomes the value 1 of the difference bit position after the node pair is inserted as described later.

The case of A<B occurs, for example, when an insert key string including a first key which duplicates the first key included in an index key is inserted into the set of existing index keys wherein the first key of the index key is unique in the existing index keys. In the example of FIG. 2B, when the insert key string "1000101001" is provided, the search key sequence number (A) is the search key sequence number 240*f* whose value is 0, and the value of the search key sequence number (B) is 1, and the result is A<B, and node 210*g* becomes the insert position and also becomes the branch node immediately above the node pair to be inserted.

Next, the processing of step S524 and thereafter, which is the processing to set data at each node and complete the insert processing, will be described.

At step S524, the array element number that is pointed to by the stack pointer of the search path stack is extracted.

At step S525*d*, leaf node is stored in the node type of the array element pointed to by the array element number obtained at step S514 and the pointer to the insert key string is stored in the reference pointer.

Proceeding to step S526, the array element at the array element number obtained at step S524 is read out from the array.

Next, at step S527, the contents read out at step S526 are stored in the array element having the array element number obtained at step S515.

Finally, at step S528*a*, branch node is stored in the node type of the array element pointed to by the array element number obtained in step S524, the search key sequence number obtained in step S510*c* is stored in the search key sequence number, the bit position obtained in step S517 is stored in the discrimination bit position, and the array element number obtained at the step S512 is stored in the coupled node indicator.

In the above-described example of inserting "1110000000" into the coupled node tree of FIG. 2B, in step S525*d*, the node [1] of the empty node pair that is acquired is made a leaf node that holds the insert key string "1110000000" and in step S527 the contents of node 211*b* are written into the node [0]. Then, in step S528*a*, a 0 is stored in the node type of node 211*b*, a 0 is stored in the search key sequence number, the difference bit position 1 that is obtained by the bit string comparison is stored in the discrimination bit position, and the array element number of the array element wherein is stored the primary node of the acquired node pair is stored into the coupled node indicator.

Figure 8A:
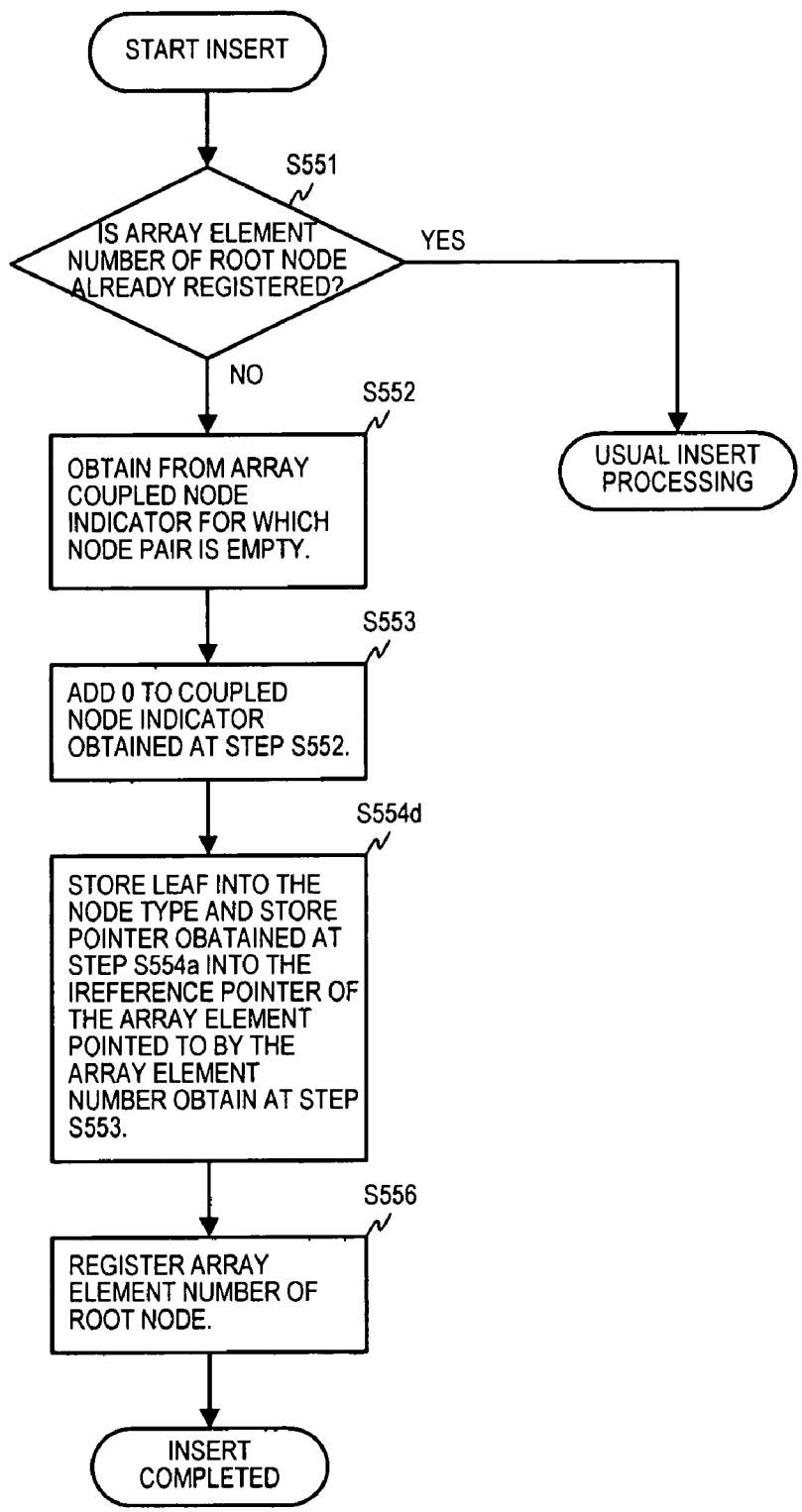
FIG. 8A is a processing flow diagram describing the overall node insert processing for a case in which an index key is added, including root node insert processing, in an embodiment of the present invention.

FIG. 8A is a processing flow diagram describing the overall node insert processing for the case in which an index key is to be inserted, including processing for insert of a root node, in a preferred embodiment of this invention.

In step S551, a judgment is made as to whether the array element number of a root node of a coupled node tree that is to be acquired as already been registered. If it has already been registered, the usual insert processing described using FIG. 5 to FIG. 7 is performed.

At step S551, if the judgment is that the registration has not yet been done, this is the case of the generation and registration of a completely new coupled node tree. Even in this case, as a prerequisite of the insert processing, it is assumed that a pointer to a storage area holding an index key is acquired and the storage area is already holding the index key.

First, at step S552, an empty node pair is obtained from the array, and the array element number of the array element to be made the primary node of the node pair is acquired. Next in step S553, the array element number is determined by adding 0 to the array element number obtained at step S552. (In actuality, this is equal to the array element number acquired in step S552). Next, in step S554*d*, leaf node is stored in the node type of the array element having the array element number acquired in step S553, that is to say, the array element corresponding to the root node, and the pointer to the insert key string is stored in the reference pointer. Then at step S556 the processing is completed by registering the array element number of the root node acquired at step S553.

As described above, it will be understood that when there is a set of index keys, the index keys are successively extracted therefrom, and the processing of FIG. 8A and FIG. 5 to FIG. 7 is repeated so as to enable the creation of a coupled node tree according to the present invention corresponding to the set of index keys.

Figure 8B:
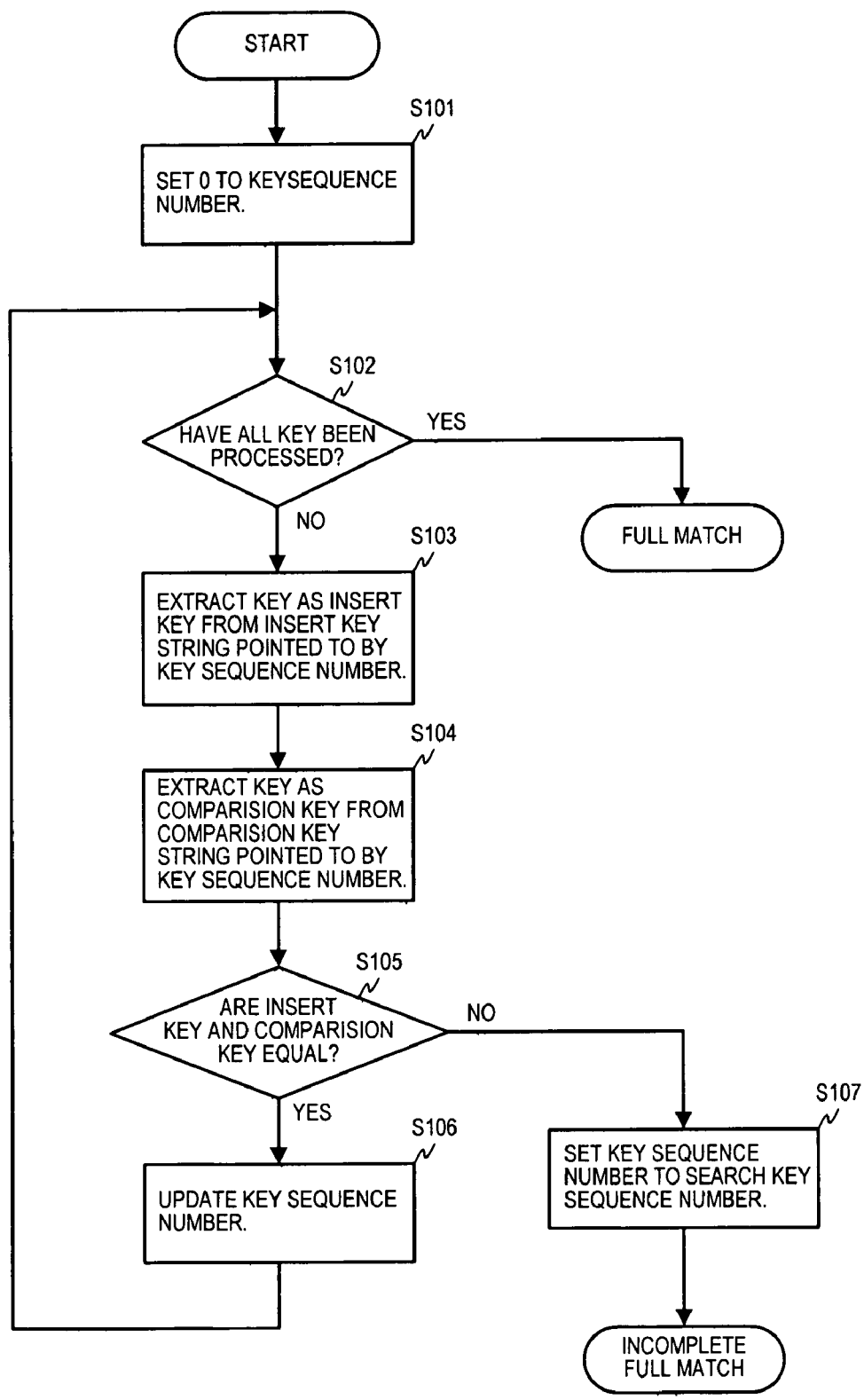
FIG. 8B is a drawing showing the processing flow for key string comparison processing in an embodiment of the present invention.

Next, referencing FIG. 8B, the processing flow of the key string comparison processing, in a preferred embodiment of this invention, that executes step S510*c* shown in the previously note FIG. 5 is described.

As shown in the drawing, in step S101, the value "0" is set in the key sequence number as an initial value.

In step S102, a determination is made whether all the keys in the string have been processed, and if the processing is finished the information of a perfect match is output and processing terminates, and if processing is not finished, processing proceeds to step S103.

At step S103, the key pointed to by the key sequence number is extracted from the insert key string and set as the insert key.

Proceeding to step S104, the key pointed to by the key sequence number is extracted from the comparison key string set in step 510*b* shown in FIG. 5.

Next, proceeding to step S105, a determination is made whether the insert key coincides with the comparison key. If they coincide, at step S106, the value set in the key sequence number is updated and return is made to step S102, and if they do not coincide, processing moves to step S107 wherein the key sequence number is set as the search key sequence number, incomplete match is output, and processing terminates.

Figure 9:
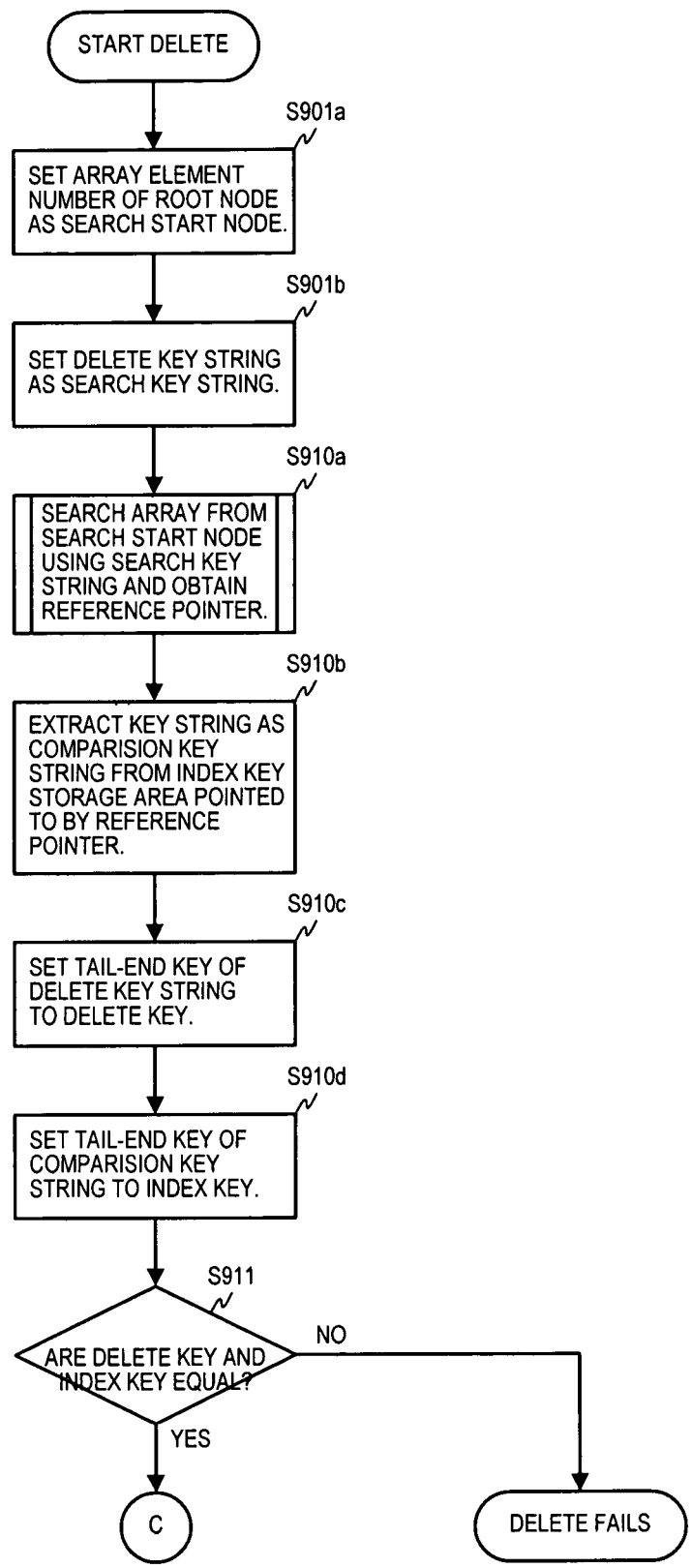
FIG. 9 is a drawing showing the processing flow for search processing, which is the first part of delete processing in an embodiment of the present invention.
Figure 10:
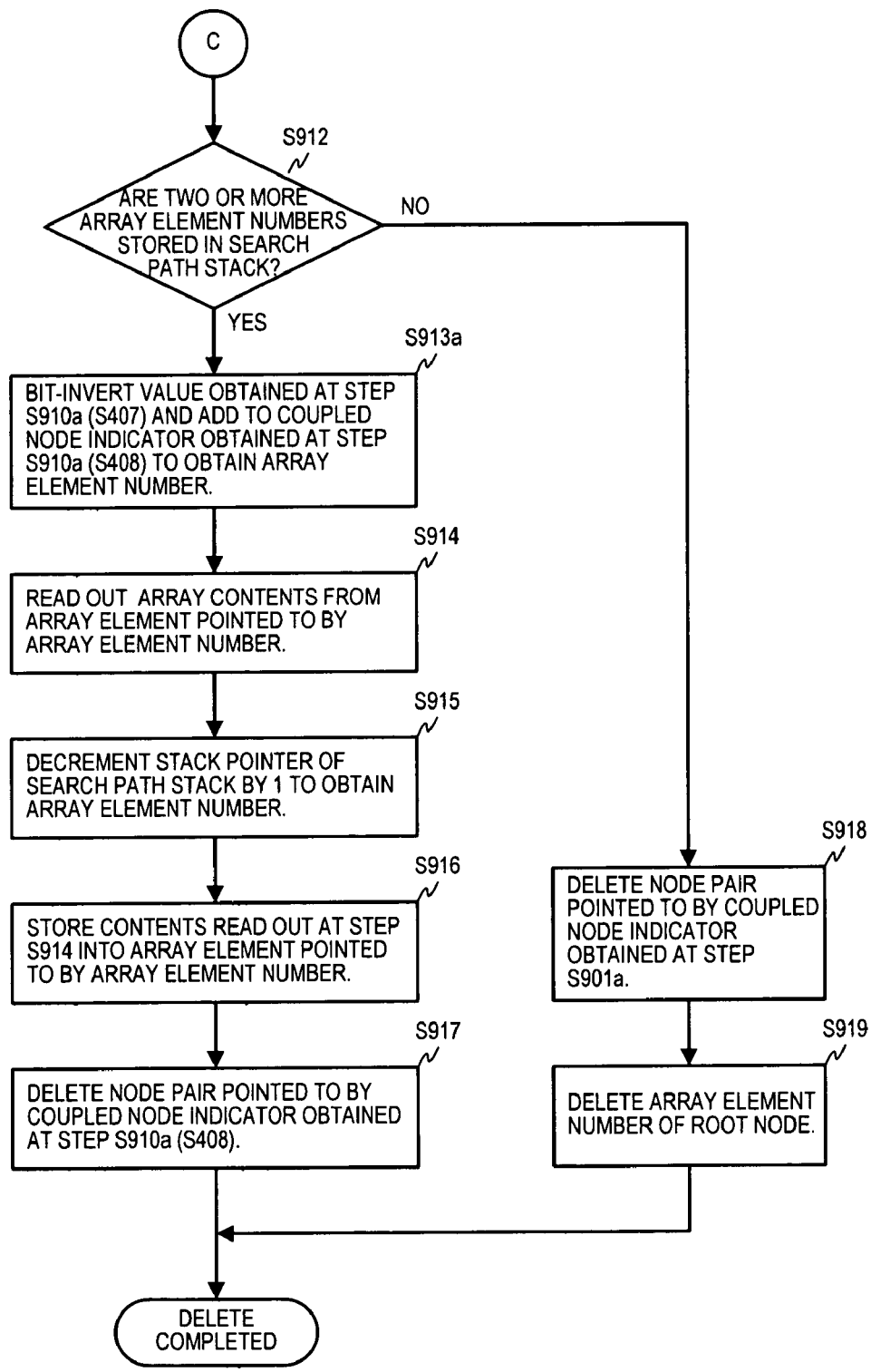
FIG. 10 is a drawing showing the processing flow of the second part of delete processing in an embodiment of the present invention.

Next, referencing FIG. 9 and FIG. 10, the processing flow to delete from a coupled node tree, according to a preferred embodiment of this invention, a leaf node corresponding to a specific index key is described.

FIG. 9 is a drawing showing the processing flow for search processing, which is the first stage of delete processing, this corresponding to the using of a delete key as the search key in the search processing shown in FIG. 4 with the root node as the search start node.

First, at step S901*a*, the array element number of the root node is set in the search start node, and, at step S901*b*, the delete key string is set in the search key string.

Next in step S910*a*, the search processing shown in FIG. 4 is performed using the search key string and the search start node, and a reference pointer is acquired, and, in step S910*b*, the key string pointed to by the reference pointer is extracted and set in the comparison key string.

Next, in step S910*c*, the tail-end key of the delete key string is set as the delete key and, in step S910*d*, the tail-end key of the comparison key string is set as the index key.

In step S911 in FIG. 9, a comparison is performed between the delete key set in step S910*c* and the index key and, because if there is no equality the index key to be deleted does not exist in the coupled node tree, the delete fails, and processing ends. But if there is equality, processing proceeds to step S912 and thereafter in FIG. 10. To compare the tail-end key in the above noted key string depends on it being a unique key with no duplicates.

FIG. 10 is a drawing describing the processing flow of the latter stage of the delete processing.

First, at step S912, a judgment is made as to whether or not there are at least 2 array element numbers on the search path stack. Stated differently, when there is only 1, it is the array element number of the array element in which the root node is stored. In this case, processing moves to step S918, at which the node pair related to the array element number of the root node obtained at step S901a is deleted. Next, proceeding to step S919, the array element number of the root node is unregistered, and processing is terminated.

When at step S912 the judgment is made that there are two or more array element numbers stored in the search path stack, processing proceeds to step S913a, at which an array element number is obtained by adding the inversion of the value obtained at step S407 in the search processing shown in FIG. 4 executed in step S910a is added to the coupled node indicator obtained at step S408 in the search processing shown in FIG. 4 executed in step S910a. This processing is performed to determine the array element number of a node that forms a pair with a leaf node to be deleted.

Next, at step S914, the contents of the array element having the array element number obtained at step S913 are read out, and at step S915 the stack pointer of the search path stack is decremented by 1 and the array element number is extracted.

Next, at step S916, the contents of the array element having the array element read out at step S914 are written over the array element having the array element number obtained at step S915. This processing replaces the branch node that is the link source to the leaf node to be deleted with the above-noted node that forms a pair with the leaf node.

Continuing, in step S917, processing is completed by deleting the node associated with the coupled node indicator obtained in step S408 in the processing shown in FIG. 4 executed in step S910a.

Figure 11A:
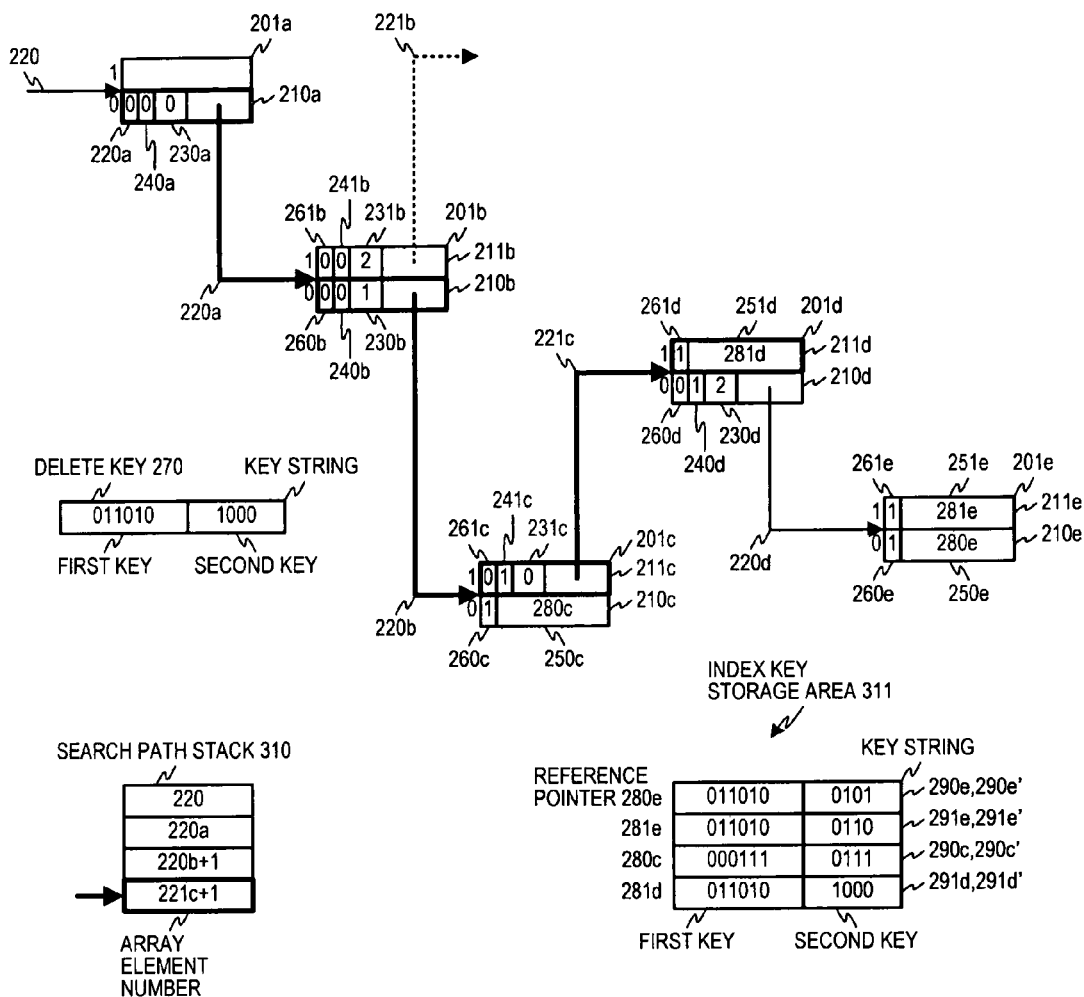
FIG. 11A is a drawing describing a coupled node tree before delete processing and an example of a delete key string.
Figure 11B:
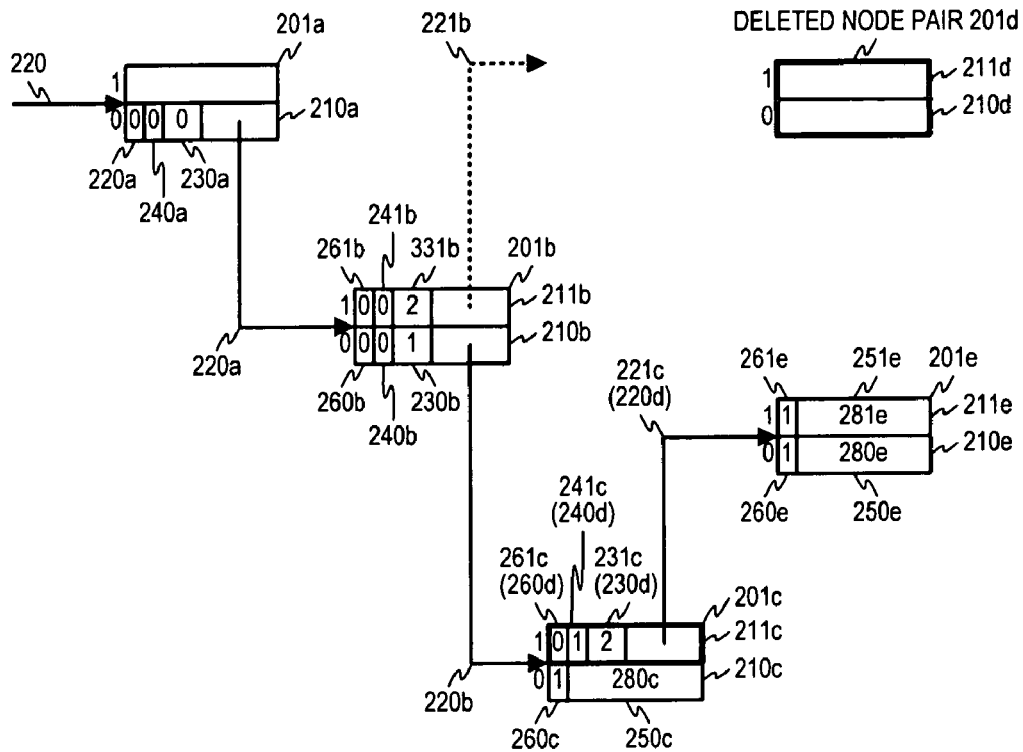
FIG. 11B is a drawing describing the coupled node tree after delete processing.
Figure 11B:
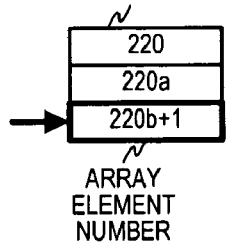

FIG. 11A and FIG. 11B are drawings describing the delete of the index key string "0110101000" from the coupled node tree shown as the example in FIG. 2B.

In the coupled node tree shown in FIG. 11A, the nodes 201f and below are omitted. The delete key string "0110101000" is composed of the first key "011010" and the second key "1000" and is stored in the delete key 270, which is a temporary storage area.

An array element number is stored in the search path stack 310 and this stack pointer points to the array element number 221c+1. Nodes enclosed by thick lines in the drawing are the nodes that are traversed by the search processing, the array element numbers thereof, from that of the root node 210a to that of the leaf node 211d, being stored in the search path stack 310.

In the search processing using a delete key string "0110101000", first the array element number 220 of the root node 210a is acquired and stored in the search path stack 310. Because the search key sequence number 240a of the root node 210a is 0, the first key "011010" of the delete key string is extracted and set in the search key, and because the discrimination bit position 230a of the root node 210a is 0 and the bit value of the bit position 0 of the delete key is 0, the array element number 220a which is obtained by adding "0" to the coupled node indicator 220a is stored in the search path stack 310.

Next, the node 210b pointed to by the array element number 220a is read out and a determination is made that it is a branch node. Because the search key sequence number 240b is 0 and does not differ from the search key sequence number 240a, the bit value 1 in the bit position corresponding to the value 1 in the discrimination bit position 230b is acquired from previously set search key and is added to the coupled node indicator 220b, obtaining the array element number 220b+1, and that value is stored in the search path stack 310.

Next, the node 211c is read out and, because the search key sequence number is 1 and has been updated once, the second key "1000" of the delete key string is set as the search key. Because the discrimination bit position 231c is 0 and the bit value of the bit position 0 of the delete key is 1, the array element number 221c+1 which is obtained by adding "1" to the coupled node indicator 221c is stored in the search path stack 310.

The node type 261d of the node 211d stored in the array element having the array element number 221c+1 is 1, indicating that this is a leaf node. The index key (key string (291d, 291d')) corresponding to this leaf node is stored in the storage area shown by the reference pointer 281d. That storage area is one part of the index key storage area 311. Th ere, when the second key 291d' that is the tail-end of the index key referenced by the reference pointer 281d is extracted, its value is "1000" and coincides with the second key stored in the delete key 270.

In the status shown in FIG. 11A, the contents of the node 210d that forms a pair with the node 211d that is the object of the delete are read out, and those contents are stored in the array element (node 211c) having the array element number 220b+1 that is stored in the location pointed to by the stack pointer of the search path stack 310 after decrementing the pointer by 1. After that, the node pair 201d is deleted. After delete of the node pair, the array element becomes empty, enabling its re-use.

The coupled node tree shown in FIG. 11B shows the status after completion of the delete processing. As shown by the reference symbols in parentheses, the node type 261c, the search key sequence number 241c, the discrimination bit position 231c, and the coupled node indicator 221c of the node 211c are the values that had been stored in the node 210d as is. Also the stack pointer of the search path stack 310 points to the array element number 220b+1.

Figure 12A:
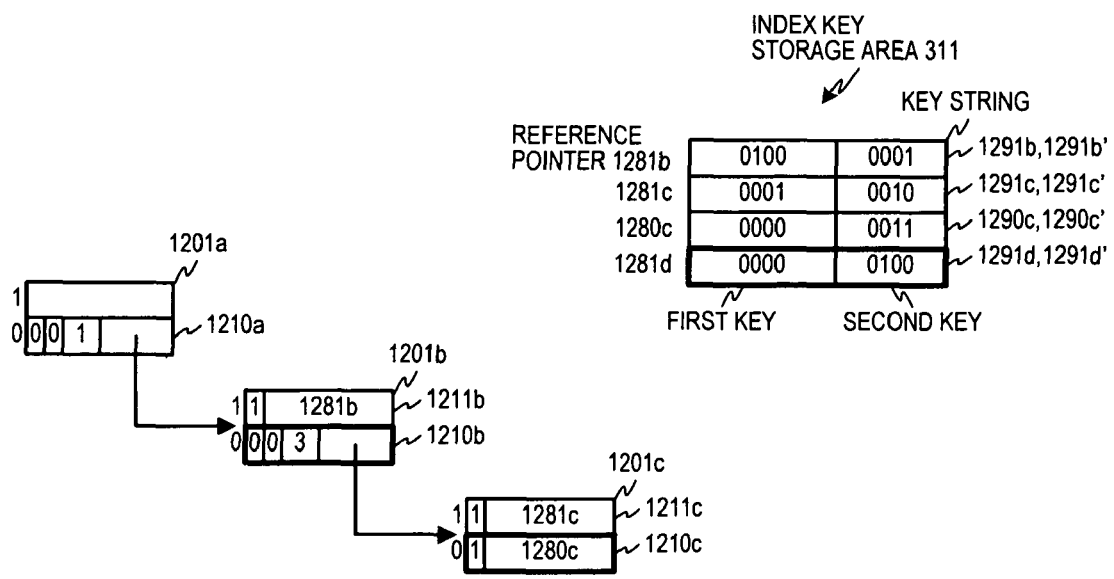
FIG. 12A is a drawing describing a coupled node tree before insert processing and an example of an insert key string.
Figure 12B:
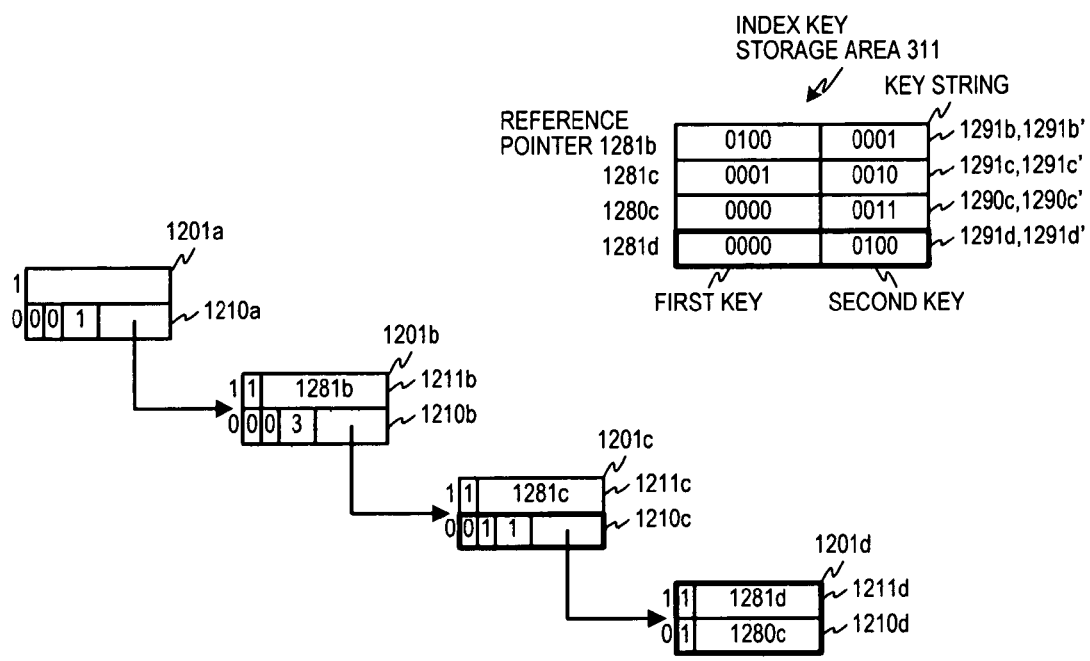
FIG. 12B is a drawing describing the coupled node tree after insert processing.

Next, FIG. 12A and FIG. 12B are used to further describe the insert processing, using a concrete example.

What is shown in FIG. 12A is the coupled node tree that has the bit strings "01000001", "00010010", and "00000011" referenced by the reference pointers 1281b, 1281c, and 1280c.

The key string composed of the first key 1291b "0100" and the second key 1291b' "0001" is stored in the storage area pointed to by the reference pointer 1281b. In the same way, the key string composed of the first key 1291c "0001" and the second key 1291c' "0010" is stored in the storage area pointed to by the reference pointer 1281c and the key string composed of the first key 1290c "0000" and the second key 1290c' "0011" is stored in the storage area pointed to by the reference pointer 1280c.

The insert key string to be inserted hereinbelow is the "00000100" shown in the example. As described above, the pointer 1281d to the index key storage area is acquired and the insert key string is stored in the storage area pointed to by the pointer 1281d, and it is presumed that the second key "0100" that is the tail end key of the insert key string is a unique value among all the index keys.

The tree shown consists of the node pairs 1201a, 1201b, and 1201c.

The primary node of the node pair 1201a is the root node 1210a, and 0 is held in the search key sequence number and 1 is held in the discrimination bit position thereof. The primary node 1210b of the node pair 1201b below the node pair 1201a is a branch node, with a 0 in the search key sequence number and a 3 stored in the discrimination bit position thereof, and the node 1211*b* forming a pair with the primary node 1210*b* is a leaf node, in which is held the reference pointer 1281*b* pointing to the key string (1291*b*, 1291*b*'). The node 1210*b*, which is a branch node, is linked to the node pair 1201*c*.

Both the nodes 1210*c* and 1211*c* that form the node pair 1201*c* are leaf nodes, which hold the reference pointers 1280*c* and 1281*c*, respectively, which in turn, point to the key strings (1290*c*, 1290*c*') and (1291*c*, 1291*c*').

The first key 1291*d* of the insert key string duplicates the first key of the key string stored in the storage area point to by the reference pointer 1280*c*. Thus in the example shown, when a search is done with the insert key string, leaf node 1210*c* holding the reference pointer 1280*c* is reached and a determination of the magnitude relationship and a bit string comparison is performed between the second key 1290*c*' set as the comparison key and the second key 1291*d*' of the insert key string set as the insert key. When that is done, the insert key is larger than the comparison key and the position of the first non-coinciding bit becomes 1.

FIG. 12B is a drawing showing the coupled node tree after inserting the insert key "00000100". A new node pair 1201*d* is inserted below the node pair 1201*c*. The node [1] 1211*d* of the node pair 1201*d* with a pointer to the insert key string as the reference pointer 1281*d* has been generated as a leaf node, and the contents of node 1210*c* shown in FIG. 12A has been written into node [0] 1210*d*. Then, as shown in FIG. 12B, a 1 is stored in the search key sequence number of the branch node 1210*c* to indicate the second key, and a 1 is stored in the discrimination bit position to indicated the first non-coinciding bit position between the insert key and the comparison key, and the array element number of the array element holding the primary node 1210*d* of the node pair 1201*d* is stored in the coupled node indicator.

The above describes details of the preferred embodiment for implementing this invention but it will be clear to a person skilled in the art that the embodiments for implementing this invention are not limited to this embodiment and a variety of modifications thereof are possible. For example, it is apparent to a person with ordinary skill in the art that a leaf node could include an index key itself instead of information indicating the position of the storage area in which the index key is stored. Although in the above description, the search key sequence number which distinguishes key positions in the search key string in a sequence of 0, 1, 2, . . . from the left is made a key position number based on the sequence lineup of the key, it is apparent to a person with ordinary skill in the art that it is not restricted to this and, for example, it can be made an offset value from the first bit of the whole key or it could distinguish an alternation of key position by using alternately 0 and 1.

Also, it will be understood that the bit string search apparatus of the present invention can be implemented in a computer by a storage means for storing the coupled node tree and a program that the computer is caused to execute to perform the processing shown in FIG. 4.

Additionally, it is clear that it is possible to embody an insert method according to the present invention by a program that a computer is caused to execute to perform the insert processing shown in FIG. 8A, FIG. 8B and in FIG. 5 to FIG. 7 and its equivalents, and that it is possible to embody a delete method according to the present invention by a program that a computer is caused to execute to perform the delete processing shown in FIG. 9 and FIG. 10 and its equivalents. Also, it is possible by means of these programs to embody in a computer a method for identifying a branch node and a leaf node and a method for linking to one of a node pair of a link target in response to the discrimination bit position of the branch node.

Therefore, the above-noted programs, and a computer-readable storage medium into which the programs are stored, are encompassed by the embodiments of the present invention. Additionally, the data structure of the coupled node tree according to the present invention is encompassed by the embodiments of the present invention.

By using the coupled node tree provided by the present invention and having a totally novel data structure as described in detail above, it is possible to handle duplicate keys as well as performing searching of bit strings at higher speeds, and also to easily perform additions and deletes of bit string data.

What is claimed is:

1. A bit string search method using a coupled node tree which is used in a bit string search and comprises a root node and a node pair, the node pair being a branch node and leaf node, or a pair of branch nodes, or a pair of leaf nodes in adjacent storage areas, wherein the root node is a node that expresses a starting point of the tree and which is a leaf node when there is one node in the tree and a branch node when there are two or more nodes in the tree, and the branch node includes a first position information indicating a position of a primary node, which is one node of a node pair of a link target, and the leaf node includes a second position information indicating a position of a storage area in which is stored an index key composed of a bit string that is the target of a search, the index key being a key string formed of three or more keys of which a tail end key is an unduplicated unique key, and the branch node further including a search key sequence number distinguishing a position of a key within a search key string for the bit string search and a discrimination bit position of the key, comprising:

repeating linkage, at the branch node, to a primary node or a node at a position in a memory area adjacent thereto of a node pair of the link target from an arbitrary node of the coupled node tree as a search start node in accordance with a bit value of a key at a discrimination bit position included in the branch node, which key is distinguished within a search key string by a search key number included in the branch node, until the leaf node is reached; and reading out an index key stored in the storage area indicated by the second position information included in the leaf node and the index key being made a search result key string, which is a search result using the search key string of an arbitrary subtree having the search start node as its root node.

2. The bit string search method according to claim 1, wherein the coupled node tree is stored in an array and the first position information is an array element number of an array element of the array in which a primary node corresponding to the first position information is stored.

3. The bit string search method according to claim 2, wherein the array element number of the array element holding the search start node and the array element numbers of array elements holding the nodes that are the link targets from the search start node to a leaf node are successively stored in a stack.

4. A leaf node insert method for inserting a new leaf node that includes the second position information indicating a position of a storage area holding an index key into the coupled node tree which is used by the bit string search method according to claim 1, the method comprising:
- a search result key string obtaining step that, using the root node of the coupled node tree as the search start node, obtains as a search result a search result key string by the bit string search method according to claim 1 while memorizing the link path from the root node to the leaf node;
- a search key sequence number obtaining step that obtains, by comparing each keys in the search key string and in the search result key string successively from the keys in the beginning of the key strings, the position of the keys with the first different value;
- a comparison step that performs a magnitude comparison and a bit string comparison between a key in the search key string and a key in the search result key string at the key position obtained in the search key sequence number obtaining step;
- an insert position determining step that determines a position for inserting a node pair that includes the leaf node to be inserted and another node by the relative positional relationship between the search key sequence numbers of the branch nodes on the link path and the key position obtained in the search key sequence number obtaining step and by the relative positional relationship between the bit position of the first differing bit value obtained in the bit string comparison of the comparison step and the discrimination bit positions of the branch nodes on the link path;
- a node position determining step that determines, by the result of the magnitude comparison in the comparison step, in which node of the node pair to be inserted is the leaf node to be inserted; and
- a leaf node generating step that stores in the leaf node, as the second position information, the information indicating the position of a storage area holding the new index key.

5. The leaf node insert method according to claim 4, wherein
the coupled node tree is stored in an array and the first position information is an array element number of an array element of the array in which a primary node corresponding to the first position information is stored.

6. The leaf node insert method according to claim 5, wherein
the array element number of the array element holding the root node and the array element numbers of array elements holding the nodes that are the link targets from the search start node to a leaf node are successively stored in a stack.

7. A leaf node delete method for deleting a leaf node that includes the second position information indicating a position of a storage area holding a specified index key from the coupled node tree which is used by the bit string search method according to claim 1, the method comprising:
- acquiring a search result key string, in accordance with the bit string search method according to claim 1, using the index key as a search key string and the root node of the coupled node tree as the search start node;
- storing a node that is a pair to a leaf node that includes, as its second position information, information indicating a position of a storage area holding the search result key string, into a branch node that is the link source of the leaf node so as to delete the leaf node.

8. The leaf node delete method according to claim 7, wherein
the coupled node tree is stored in an array and the first position information is an array element number of an array element of the array in which a primary node corresponding to the first position information is stored.

9. The leaf node delete method according to claim 8, wherein
the array element number of the array element holding the search start node and the array element numbers of array elements holding the nodes that are the link targets from the search start node to a leaf node are successively stored in a stack.

10. A tangible non-transitory computer readable medium that holds a program for execution by a computer of the bit string search method according to claim 1.

11. A tangible non-transitory computer readable medium that holds a tree data structure for use in bit string searches comprising:
- a coupled node tree which comprises
- a root node and a node pair, the node pair being a branch node and leaf node, or a pair of branch nodes, or a pair of leaf nodes in adjacent storage areas, wherein
- the root node is a node that expresses a starting point of the tree and which is a leaf node when there is one node in the tree and a branch node when there are two or more nodes in the tree,
- the branch node includes a first position information indicating a position of a primary node which is one node of a node pair of a link target, and the leaf node includes a second position information indicating a position of a storage area in which is stored an index key composed of a bit string that is the target of a search,
- the index key being a key string formed of three or more keys of which a tail end key is an unduplicated unique key, and the branch node further including a search key sequence number distinguishing a position of a key within a search key string for the bit string search and a discrimination bit position of the key, and with an arbitrary node of the coupled node tree as the search start node, at the branch node, a search is enabled using the search key string by repeatedly and successively linking to a primary node or a node at apposition in a memory area adjacent thereto of a node pair of a link target, in accordance with a bit value of a key at a discrimination bit position included in the branch node, which key is distinguished within the search key string by a search key sequence number included in the branch node, until the leaf node is reached.

12. The tangible non-transitory computer readable medium according to claim 11, wherein
the coupled node tree is stored in an array and the first position information is an array element number of an array element of the array in which a primary node corresponding to the first position information is stored.

13. A bit string search apparatus comprising:
- a coupled node tree which is used in a bit string search and comprises a root node and a node pair, the node pair being a branch node and leaf node, or a pair of branch nodes, or a pair of leaf nodes in adjacent storage areas, wherein
- the root node is a node that expresses a starting point of the tree and which is a leaf node when there is one node in the tree and a branch node when there are two or more nodes in the tree, and the branch node includes a first position information indicating a position of a primary node which is one node of a node pair of a link target, and the leaf node includes a second position information indicating a position of a storage area in which is stored an index key composed of a bit string that is the target of a search, the index key being a key string formed of three or more keys of which the tail end key is an unduplicated unique key, and the branch node further including a search key sequence number distinguishing a position of a key within a search key string for the bit string search and a discrimination bit position of the key;

a link means repeating linkage, at the branch node, to a primary node or a node at a position in a memory area adjacent thereto of a node pair of the link target from an arbitrary node of the coupled node tree as a search start node in accordance with a bit value of a key at a discrimination bit position included in the branch node, which key is distinguished within a search key string by a search key number included in the branch node, until the leaf node is reached; and a search result obtaining means reading out an index key stored in the storage area indicated by the second position information included in the leaf node and the index key being made a search result key string, which is a search result using the search key string of an arbitrary subtree having the search start node as its root node.

14. The bit string search apparatus according to claim 13, wherein the coupled node tree is stored in an array and the first position information is an array element number of an array element of the array in which a primary node corresponding to the first position information is stored.

15. The bit string search apparatus according to claim 14, wherein the array element number of the array element holding the search start node and the array element numbers of array elements holding the nodes that are the link targets from the search start node to a leaf node are successively stored in a stack.

* * * * *